US012675056B2

(12) United States Patent
Yoshihara

(10) Patent No.: US 12,675,056 B2
(45) Date of Patent: Jul. 7, 2026

(54) METHOD FOR PRODUCING ELECTROSTATIC CHARGE IMAGE DEVELOPMENT TONER

(71) Applicant: FUJIFILM Business Innovation Corp., Tokyo (JP)

(72) Inventor: Kotaro Yoshihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 671 days.

(21) Appl. No.: 18/178,543

(22) Filed: Mar. 6, 2023

(65) Prior Publication Data

US 2023/0305411 A1 Sep. 28, 2023

(30) Foreign Application Priority Data

Mar. 28, 2022 (JP) ................................ 2022-052252

(51) Int. Cl.
*G03G 9/08* (2006.01)
*G03G 9/087* (2006.01)

(52) U.S. Cl.
CPC ....... *G03G 9/0804* (2013.01); *G03G 9/08755* (2013.01)

(58) Field of Classification Search
CPC .......................... G03G 9/0804; G03G 9/08755
See application file for complete search history.

(56) References Cited

U.S. PATENT DOCUMENTS 7,642,033 B2 1/2010 Ikami et al.
2019/0243269 A1 * 8/2019 Hara .................. G03G 9/09307

FOREIGN PATENT DOCUMENTS

JP 2006227211 8/2006
JP 2011203548 10/2011
(Continued)

OTHER PUBLICATIONS

Pigment yellow 74. Ataman Kimya. (n.d.). https://www.atamanchemicals.com/pigment-yellow-74_u33462/ (Year: 2020).*
(Continued)

*Primary Examiner* — Mark F. Huff
*Assistant Examiner* — Boone Alexander Evans
(74) *Attorney, Agent, or Firm* — JCIPRNET

(57) ABSTRACT

A method for producing an electrostatic charge image development toner includes: a first step of aggregating polyester resin particles and a flat color material to produce a first aggregated particle dispersion in which first aggregated particles having a number-average particle diameter of 1 μm or more are dispersed; a second step of adding a non-crystalline resin particle dispersion in which non-crystalline resin particles are dispersed to the first aggregated particle dispersion to cause the non-crystalline resin particles to be attached to the first aggregated particles and obtain second aggregated particles; and a third step of heating a second aggregated particle dispersion in which the second aggregated particles are dispersed to cause the second aggregated particles to coalesce, wherein the non-crystalline resin particle dispersion satisfies Formulas (1) to (3), Formula (1): $-0.01\times A-0.25\times B+9.2\leq pH\leq -0.01\times A-0.25\times B+10.0$, Formula (2): $100\text{ nm}\leq A\leq 250\text{ nm}$, Formula (3): $5\text{ mgKOH/g}\leq B\leq 20\text{ mgKOH/g}$, in which A is a particle diameter of the non-crystalline resin particles, B is an acid value of the non-crystalline resin, and pH is a pH of the non-crystalline resin particle dispersion.

8 Claims, 2 Drawing Sheets

(56) References Cited

FOREIGN PATENT DOCUMENTS

| | | |
|---|---|---|
| JP | 2016139053 | 8/2016 |
| JP | 2017116777 | 6/2017 |
| JP | 2018040902 | 3/2018 |
| JP | 2018097052 | 6/2018 |
| JP | 2021135468 | 9/2021 |

OTHER PUBLICATIONS

"Notice of Reasons for Refusal of Japan Counterpart Application", issued on Nov. 4, 2025, with English translation thereof, p. 1-p. 8.

* cited by examiner

METHOD FOR PRODUCING ELECTROSTATIC CHARGE IMAGE DEVELOPMENT TONER

CROSS-REFERENCE TO RELATED APPLICATIONS

This application is based on and claims priority under 35 USC 119 from Japanese Patent Application No. 2022-052252 filed on Mar. 28, 2022.

BACKGROUND

(i) Technical Field

The present invention relates to a method for producing an electrostatic charge image development toner.

(ii) Related Art

JP2018-097052A proposes "an electrostatic latent image development toner including a plurality of toner particles each including a core containing a binder resin and a release agent and a multi-layered shell layer partially covering a surface of the core, wherein the multi-layered shell layer includes a first shell layer containing a first polymer including a repeating unit having an oxazoline group, a second shell layer containing a second polymer including a repeating unit having a carboxyl group, and a third shell layer containing a third polymer including a repeating unit having an oxazoline group, the first shell layer, the second shell layer, and the third shell layer have a stacked structure in which the first shell layer, the second shell layer, and the third shell layer are stacked in this order from the core side, and the second shell layer is in contact with a region not covered with the first shell layer in a surface region of the core".

SUMMARY

Aspects of non-limiting embodiments of the present disclosure relates to a method for producing an electrostatic charge image development toner, the method including a first step of aggregating polyester resin particles and a flat color material to produce a first aggregated particle dispersion in which first aggregated particles having a number-average particle diameter of 1 μm or more are dispersed, a second step of adding a non-crystalline resin particle dispersion in which non-crystalline resin particles are dispersed to the first aggregated particle dispersion to cause the non-crystalline resin particles to be attached to the first aggregated particles and obtain second aggregated particles, and a third step of heating a second aggregated particle dispersion in which the second aggregated particles are dispersed to cause the second aggregated particles to coalesce, wherein as compared where Formula (C1), Formula (C2), or Formula (C3) shown below is satisfied, or a case where a pH of the non-crystalline resin particle dispersion is less than 3.0 or more than 6.5, an electrostatic charge image development toner that reduces occurrence of gloss unevenness can be obtained when an image having a high image density is formed after images were continuously formed under a high-temperature and high-humidity environment (for example, 30° C., 85% RH), and then the image forming apparatus is stopped for a certain period of time, $$-0.01\times A-0.25\times B+9.2>\mathrm{pH} \text{ or } \mathrm{pH}>-0.01\times A-0.25\times B+10.0 \quad \text{Formula (C1)}$$

$$100\ \mathrm{nm}>A \text{ or } A>250\ \mathrm{nm} \quad \text{Formula (C2)}$$

$$5\ \mathrm{mgKOH/g}>B \text{ or } B>20\ \mathrm{mgKOH/g} \quad \text{Formula (C3)}$$

wherein A is a particle diameter of the non-crystalline resin particles, B is an acid value of the non-crystalline resin, and pH is a pH of the non-crystalline resin particle dispersion.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a method for producing an electrostatic charge image development toner, the method including:

a first step of aggregating polyester resin particles and a flat color material to produce a first aggregated particle dispersion in which first aggregated particles having a number-average particle diameter of 1 μm or more are dispersed;

a second step of adding a non-crystalline resin particle dispersion in which non-crystalline resin particles are dispersed to the first aggregated particle dispersion to cause the non-crystalline resin particles to be attached to the first aggregated particles and obtain second aggregated particles; and a third step of heating a second aggregated particle dispersion in which the second aggregated particles are dispersed to cause the second aggregated particles to coalesce, wherein the non-crystalline resin particle dispersion satisfies Formulas (1) to (3) shown below, $$-0.01\times A-0.25\times B+9.2\leq\mathrm{pH} \text{ or } \mathrm{pH}\leq-0.01\times A-0.25\times B+10.0 \quad \text{Formula (1)}$$

$$100\ \mathrm{nm}\leq A \text{ or } A\leq250\ \mathrm{nm} \quad \text{Formula (2)}$$

$$5\ \mathrm{mgKOH/g}\leq B \text{ or } B\leq20\ \mathrm{mgKOH/g} \quad \text{Formula (3)}$$

wherein A is a particle diameter of the non-crystalline resin particles, B is an acid value of the non-crystalline resin, and pH is a pH of the non-crystalline resin particle dispersion.

DETAILED DESCRIPTION

Figure 1:
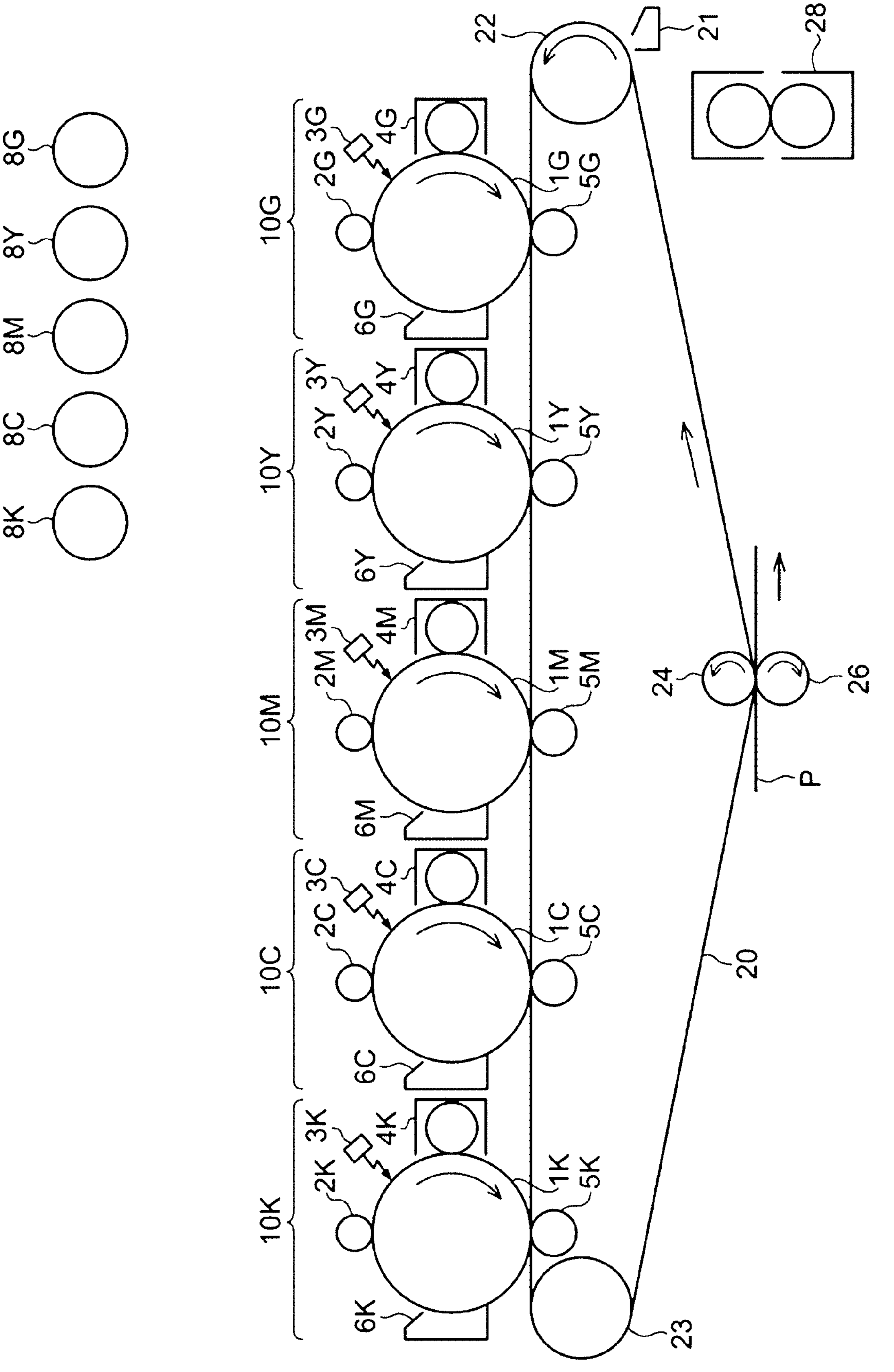
FIG. 1 is a schematic configuration diagram illustrating an image forming apparatus according to an exemplary embodiment.

Hereinafter, exemplary embodiments of the present invention will be described. These descriptions and Examples illustrate the exemplary embodiments and do not limit the scope of the invention.

In stepwise numerical ranges in the present specification, the upper limit or the lower limit in one numerical range may be replaced with the upper limit or the lower limit of another stepwise numerical range. The upper limit or the lower limit of any numerical range described in the present specification may be replaced with a value described in Examples.

Each component may include a plurality of corresponding substances.

The amount of each component in a composition refers to, when there are a plurality of substances corresponding to each component in the composition, the total amount of the plurality of substances present in the composition unless otherwise specified.

In the present specification, the term "step" includes not only an independent step but also a step that cannot be clearly distinguished from other steps but achieves the purpose of the step.

Each component may include a plurality of corresponding substances.

<Method for Producing Electrostatic Charge Image Development Toner>

A method for producing an electrostatic charge image development toner according to a first exemplary embodiment (hereinafter it may be simply referred to as "toner") includes a first step of aggregating polyester resin particles and a flat color material to produce a first aggregated particle dispersion in which first aggregated particles having a number-average particle diameter of 1 μm or more are dispersed, a second step of adding a non-crystalline resin particle dispersion in which non-crystalline resin particles are dispersed to the first aggregated particle dispersion to cause the non-crystalline resin particles to be attached to the first aggregated particles and obtain second aggregated particles, and a third step of heating a second aggregated particle dispersion in which the second aggregated particles are dispersed to cause the second aggregated particles to coalesce, wherein the non-crystalline resin particle dispersion satisfies Formulas (1) to (3).

$$-0.01\times A-0.25\times B+9.2\leq \text{pH or pH}\leq -0.01\times A-0.25\times B+10.0 \quad \text{Formula (1)}$$

$$100\text{ nm}\leq A \text{ or } A\leq 250\text{ nm} \quad \text{Formula (2)}$$

$$5\text{ mgKOH/g}\leq B \text{ or } B\leq 20\text{ mgKOH/g} \quad \text{Formula (3)}$$

In Formulas (1) to (3), A is a particle diameter of the non-crystalline resin particles, B is an acid value of the non-crystalline resin, and pH is a pH of the non-crystalline resin particle dispersion.

The above-described method for producing a toner according to the first exemplary embodiment can obtain a toner that reduces occurrence of gloss unevenness when an image having a high image density is formed after images are continuously formed under a high-temperature and high-humidity environment and then the image forming apparatus is stopped for a certain period of time. The reason is assumed as follows.

Gloss unevenness tends to occur when an image having a high image density is formed after images are continuously formed under a high-temperature and high-humidity environment and then the image forming apparatus is stopped for a certain period of time, with a toner produced by a method for producing a toner including a first step of aggregating polyester resin particles and a flat color material to produce a first aggregated particle dispersion in which first aggregated particles having a number-average particle diameter of 1 μm or more are dispersed, a second step of adding a non-crystalline resin particle dispersion in which non-crystalline resin particles are dispersed to the first aggregated particle dispersion to cause the non-crystalline resin particles to be attached to the first aggregated particles and obtain second aggregated particles, and a third step of heating the second aggregated particle dispersion in which the second aggregated particles are dispersed to cause the second aggregated particles to coalesce.

This is considered to be because a toner containing no color material (hereinafter also referred to as "white beads") is likely to be contained in the toner in the method for producing a toner. When images are continuously formed in a high-temperature and high-humidity environment, the white beads tend to have a large charge amount, and thus, are not likely to be developed so as to tend to stay in the developing device. When the image forming apparatus is stopped for a certain period of time in this state, the charge amount of the white beads decreases, and the white beads tend to be developed like a toner containing a color material. Thus, when an image having a high image density is formed after that, the white beads are also developed to cause gloss unevenness of the image in some cases.

In the method for producing a toner according to the first exemplary embodiment, the particle diameter of the non-crystalline resin particles satisfies Formula (2). When the particle diameter of the non-crystalline resin particles is 250 nm or less, the particle diameter does not become too large, and the cohesive force between the particles of the non-crystalline resin particles tends to decrease. When the particle diameter of the non-crystalline resin particles is 100 nm or more, the dispersibility of the particles resulting from carboxy groups present on the surfaces of the non-crystalline resin particles decreases, and the non-crystalline resin particles are likely to be attached to the first aggregated particles.

In the method for producing a toner according to the first exemplary embodiment, the acid value of the non-crystalline resin satisfies Formula (3). When the acid value of the non-crystalline resin satisfies Formula (3), the amount of the carboxy groups present on the surfaces of the non-crystalline resin particles is adjusted, the dispersibility of the non-crystalline resin particles decreases, and the non-crystalline resin particles are likely to be attached to the first aggregated particles.

In the method for producing a toner according to the first exemplary embodiment, the particle diameter of the non-crystalline resin particles and the acid value of the non-crystalline resin satisfy Formula (1). As a result of intensive studies conducted by the inventors of the present invention, although the reason for this is not clear, the non-crystalline resin particles are more likely to be attached to the first aggregated particles when the particle diameter of the non-crystalline resin particles, the acid value of the non-crystalline resin, and the pH of the non-crystalline resin particle dispersion liquid satisfy Formula (1).

Thus, the method for producing a toner according to the first exemplary embodiment reduces generation of white beads.

From these, it is presumed that the method for producing a toner according to the first exemplary embodiment, having the above-described configuration, can obtain a toner that reduces occurrence of gloss unevenness when an image having a high image density is formed after images are continuously formed under a high-temperature and high-humidity environment and then the image forming apparatus is stopped for a certain period of time.

The method for producing an electrostatic charge image development toner according to a second exemplary embodiment includes a first step of aggregating polyester resin particles and a flat color material to prepare a first aggregated particle dispersion in which first aggregated particles having a number-average particle diameter of 1 μm or more are dispersed, a second step of adding a non-crystalline resin particle dispersion in which non-crystalline resin particles are dispersed to the first aggregated particle dispersion to cause the non-crystalline resin particles to be attached to the first aggregated particles and obtain second aggregated particles, and a third step of heating a second aggregated particle dispersion in which the second aggregated particles are dispersed to cause the second aggregated particles to coalesce, wherein a pH of the non-crystalline resin particle dispersion is 3.0 or more and 6.5 or less.

The method for producing a toner according to the second exemplary embodiment, having the above-described configuration, can obtain a toner that reduces occurrence of gloss unevenness when an image having a high image density is formed after images are continuously formed under a high-temperature and high-humidity environment and then the image forming apparatus is stopped for a certain period of time. The reason is assumed as follows.

In the method for producing a toner according to the second exemplary embodiment, the pH of the non-crystalline resin particle dispersion is 3.0 or more and 6.5 or less. When the pH of the non-crystalline resin particle dispersion is less than 3.0, the carboxy groups present on the surfaces of the non-crystalline resin particles do not dissociate, the particles themselves become unstable, and the non-crystalline resin particles are likely to aggregate to form white beads. When the pH of the non-crystalline resin particle dispersion is more than 6.5, the carboxy groups present on the surfaces of the non-crystalline resin particles are likely to dissociate, and the particles themselves are stabilized and are less likely to be attached to the first aggregated particles. The non-crystalline resin dispersion having a pH of 3.0 or more and 6.5 or less causes the carboxyl groups present on the surfaces of the non-crystalline particle to appropriately dissociate, helps the carboxyl groups to be attached to the surfaces of the first aggregated particle, and reduces generation of white beads.

Thus, the method for producing a toner according to the second exemplary embodiment reduces generation of white beads.

From these, it is presumed that the method for producing a toner according to the second exemplary embodiment, having the above-described configuration, can obtain a toner that reduces occurrence of gloss unevenness when an image having a high image density is formed after images are continuously formed under a high-temperature and high-humidity environment and then the image forming apparatus is stopped for a certain period of time.

Hereinafter, a method for producing a toner applicable to both the methods for producing a toner according to the first exemplary embodiment and the second exemplary embodiment will be described in detail. Note that, an example of the method for producing a toner of the present invention may be a method for producing a toner corresponding to any one of the method for producing a toner according to the first exemplary embodiment and the method for producing a toner according to the second exemplary embodiment.

The polyester resin particles and the non-crystalline resin particles are binder resins of the toner obtained by the method for producing a toner according to the exemplary embodiment.

(Dispersion Liquid Preparation Step)

Preferably, prior to performing the first step, for example, dispersions of respective materials are prepared and then mixed with each other. This is specifically performed as follows.

It is preferable to include, prior to the first step, a step of stirring the flat color material, a surfactant, and a dispersion medium to obtain a color material dispersion liquid.

Including the step to obtain a color material dispersion prevents the flat color material from aggregating in the first step and helps the polyester resin particles to be attached to the surface of the flat color material. This reduces aggregation of the polyester resin particles and generation of white balls. Thus, the method for producing a toner can obtain a toner that reduces occurrence of gloss unevenness when an image having a high image density is formed after images are continuously formed under a high-temperature and high-humidity environment and then the image forming apparatus is stopped for a certain period of time.

The surfactant and the dispersion medium have the same definitions as the surfactant and the dispersion in the first step which will be described later, and their preferable ranges are also the same.

A polyester resin particle dispersion liquid in which polyester resin particles are dispersed in a dispersion medium may be prepared prior to the first step.

As necessary, a release agent particle dispersion in which release agent particles are dispersed in a dispersion medium may be prepared prior to the first step.

(First Step)

The first step is a step of aggregating polyester resin particles and a flat color material to prepare a first aggregated particle dispersion in which first aggregated particles having a number-average particle diameter of 1 μm or more are dispersed.

In the first step, colorant particles other than the flat color material and release agent particles may be aggregated together with the polyester resin particles and the flat color material.

Here, the colorant particles other than the flat color material refer to particles containing a colorant other than the flat color material as a main component.

The particles containing a colorant other than the flat color material as a main component refer to particles in which the content of the colorant other than the flat color material is 90 mass % or more relative to the entire particles.

Examples of the colorant other than the flat color material include the colorants described in the description of the colorant other than the flat color material that may be contained in the toner, which will be described later.

The addition amount of the colorant other than the flat color material is not limited to particular amount. The content of the colorant other than the flat color material relative to the entire toner particles included in the resulting toner is preferably 1 mass % or more and 20 mass % or less, and more preferably 5 mass % or more and 15 mass % or less relative to the entire toner particles described later.

The release agent particles refer to particles containing a release agent as a main component.

Here, the particles containing a release agent as a main component refer to particles in which the content of the release agent is 90 mass % or more relative to the entire particles.

Examples of the release agent include the release agents in the description of the release agent that may be contained in the toner, which will be described later.

The addition amount of the release agent particles is not limited to particular amount. The content of the release agent relative to the entire toner particles included in the resulting toner is preferably 1 mass % or more and 20 mass % or less, and more preferably 5 mass % or more and 15 mass % or less relative to the entire toner particles described later.

The aggregation is performed by, for example, dispersing the polyester resin particles and the flat color material in a dispersion medium to obtain a dispersion and thereafter aggregating the polyester resin particles and the flat color material in the dispersion.

As necessary, release agent particles may be dispersed in the dispersion medium together with the polyester resin particles and the flat color material to obtain a dispersion, thereafter the polyester resin particles, the flat color material, and the release agent particles may be aggregated in the dispersion.

Further, for example, when a color material dispersion liquid and a polyester resin particle dispersion are produced prior to the first step, the color material dispersion and the polyester resin particle dispersion may be mixed to obtain a dispersion, thereafter the polyester resin particles and the flat color material may be aggregated in the dispersion.

As necessary, a release agent particle dispersion may be mixed with the color material dispersion and the polyester resin particle dispersion to obtain a dispersion, thereafter the polyester resin particles, the flat color material, and the release agent particles may be aggregated in the dispersion.

Specifically, the aggregation is performed by adding a flocculant to the dispersion, adjusting the pH of the dispersion to be acidic (for example, pH 2 to 5), adding a dispersion stabilizer as necessary, then heating the dispersion to a temperature corresponding to the glass transition temperature of the polyester resin particles (specifically, −30° C. or more and −10° C. or less of the glass transition temperature of the resin particles, for example), and aggregating the particles dispersed in the dispersion to form first aggregated particles.

In the first step, for example, the flocculant may be added to the dispersion under stirring at room temperature (for example, 25° C.), the pH of the dispersion may be adjusted to be acidic (for example, pH 2 to 5), a dispersion stabilizer may be added thereto as necessary, and then the heating may be performed.

In the first step, it is preferable to stir the dispersion in which the polyester resin particles and the flat color material are dispersed with a stirring blade before aggregating the polyester resin particles and the flat color material.

As described above, by stirring the dispersion in which the polyester resin particles and the flat color material are dispersed with a stirring blade, the force applied to the flat color material during the stirring of the dispersion does not become too large. This prevents deformation of the flat color material. This helps the polyester resin particles to be attached to the surface of the flat color material. This reduces aggregation of the polyester resin particles and generation of white balls.

Thus, the method for producing a toner can obtain a toner that reduces occurrence of gloss unevenness when an image having a high image density is formed after images are continuously formed under a high-temperature and high-humidity environment and then the image forming apparatus is stopped for a certain period of time.

—Polyester Resin Particle—

The polyester resin particles refer to particles containing a polyester resin as a main component.

Here, the particles containing a polyester resin as a main component refer to particles in which the content of the polyester resin is 90 mass % or more relative to the entire particles.

Examples of the polyester resin include known non-crystalline polyester resins. As the polyester resin, a crystalline polyester resin may be used in combination with a non-crystalline polyester resin. Note that, the content of the crystalline polyester resin is preferably in the range of 2 mass % or more and 40 mass % or less (preferably 2 mass % or more and 20 mass % or less) relative to the entire binder resin.

The term "crystalline" regarding resin means that the resin shows a distinct endothermic peak rather than stepwise endothermic changes as measured by differential scanning calorimetry (DSC) and specifically means that the half width of the endothermic peak in measuring at a heating rate of 10 (° C./min) is within 10° C.

The term "non-crystalline" regarding resin means that the resin shows a half width exceeding 10° C., shows stepwise endothermic changes, or shows no distinct endothermic peak.

Non-Crystalline Polyester Resin

Examples of the non-crystalline polyester resin include a condensation polymer of a polycarboxylic acid and a polyhydric alcohol. As the non-crystalline polyester resin, a commercially available product may be used, or a synthesized product may be used.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), anhydrides thereof, and lower (for example, having 1 or more and 5 or less carbon atoms) alkyl esters thereof. Of these, aromatic dicarboxylic acids are preferable as the polycarboxylic acid, for example.

As the polycarboxylic acid, a trivalent or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower (for example, having 1 or more and 5 or less carbon atoms) alkyl esters thereof.

The polycarboxylic acid may be used singly or in combination of two or more thereof.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols are preferable, and aromatic diols are more preferable as the polyhydric alcohol, for example.

As the polyhydric alcohol, a trihydric or higher polyhydric alcohol having a crosslinked structure or a branched structure may be used together with the diol. Examples of the trihydric or higher polyhydric alcohol include glycerin, trimethylolpropane, and pentaerythritol.

The polyhydric alcohol may be used singly or in combination of two or more thereof.

The glass transition temperature (Tg) of the non-crystalline polyester resin is preferably 50° C. or more and 80° C. or less, and more preferably 50° C. or more and 65° C. or less.

The glass transition temperature is determined from a DSC curve obtained by differential scanning calorimetry (DSC) in accordance with "extrapolated glass transition onset temperature" described in the method for obtaining a glass transition temperature in JIS K 7121:1987 "Testing methods for transition temperatures of plastics".

The weight-average molecular weight (Mw) of the non-crystalline polyester resin is preferably 5,000 or more and 1,000,000 or less, and more preferably 7,000 or more and 500,000 or less.

The number-average molecular weight (Mn) of the non-crystalline polyester resin is preferably 2,000 or more and 100,000 or less.

The molecular weight distribution Mw/Mn of the non-crystalline polyester resin is preferably 1.5 or more and 100 or less, and more preferably 2 or more and 60 or less.

The weight-average molecular weight and the number-average molecular weight are measured by gel permeation chromatography (GPC). The measurement of the molecular weights through GPC is performed by using GPC HLC-8120 manufactured by Tosoh Corporation as a measurement apparatus, a TSKgel SuperHM-M (15 cm) column manufactured by Tosoh Corporation, and a THF solvent. The weight-average molecular weight and the number-average molecular weight are calculated from the measurement results by using a molecular weight calibration curve formed from a monodisperse polystyrene standard sample.

The non-crystalline polyester resin is produced by a known method. Specifically, for example, it may be obtained by a method in which the polymerization temperature is set to 180° C. or more and 230° C. or less, the pressure in the reaction system is reduced as necessary, and the reaction is performed while removing water or alcohol generated during condensation.

When the raw material monomers are not dissolved or compatible at the reaction temperature, a solvent having a high boiling point may be added as a dissolution auxiliary agent to dissolve the monomers. The polycondensation reaction is performed while the dissolution auxiliary agent is evaporated. When there is a monomer poorly compatible with the main monomer, the poorly-compatible monomer may be condensed with an acid or alcohol to be condensed with the monomer in advance of polycondensation with the main monomer.

Crystalline Polyester Resin

Examples of the crystalline polyester resin include a polycondensate of a polycarboxylic acid and a polyhydric alcohol. As the crystalline polyester resin, a commercially available product may be used, or a synthesized product may be used.

To easily form a crystal structure, the crystalline polyester resin is preferably a polycondensate obtained with a polymerizable monomer having a linear aliphatic group rather than a polymerizable monomer having an aromatic group.

Examples of the polycarboxylic acid include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., phthalic acid, isophthalic acid, terephthalic acid, and dibasic acids such as naphthalene-2,6-dicarboxylic acid), anhydrides thereof, and lower (for example, having 1 to 5 carbon atoms) alkyl esters thereof.

As the polycarboxylic acid, a trivalent or higher carboxylic acid having a crosslinked structure or a branched structure may be used in combination with the dicarboxylic acid. Examples of the trivalent carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (for example, having 1 to 5 carbon atoms) alkyl esters thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used singly or in combination of two or more thereof.

Examples of the polyhydric alcohol include an aliphatic diol (for example, a linear aliphatic diol having 7 to 20 carbon atoms in the main chain). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecandiol, 1,12-dodecanediol, 1,13-tridecandiol, 1,14-tetradecandiol, 1,18-octadecandiol, and 1,14-eicosandecanediol. Of these, 1,8-octanediol, 1,9-nonanediol, and 1,10-decanediol are preferable as the aliphatic diol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used singly or in combination of two or more thereof.

The content of the aliphatic diol in the polyhydric alcohol is preferably 80 mol % or more, and preferably 90 mol % or more.

The melting temperature of the crystalline polyester resin is preferably 50° C. or more and 100° C. or less, more preferably 55° C. or more and 90° C. or less, and still more preferably 60° C. or more and 85° C. or less.

The melting temperature is determined from a DSC curve obtained by differential scanning calorimetry (DSC) in accordance with "melting peak temperature" described in the method for obtaining a melting temperature in JIS K 7121:1987 "Testing methods for transition temperatures of plastics".

The weight-average molecular weight (Mw) of the crystalline polyester resin is preferably 6,000 or more and 35,000 or less.

The crystalline polyester resin may be obtained by, for example, a well-known production method as in the case of the non-crystalline polyester.

The volume-average particle diameter of the polyester resin particles before aggregation dispersed in the dispersion is preferably 0.01 μm or more and 1 μm or less, more preferably 0.08 or more and 0.8 μm or less, and still more preferably 0.1 μm or more and 0.6 μm or less.

The volume-average particle diameter of the polyester resin particles is measured as follows: drawing a volume-based cumulative distribution in divided particle size ranges (channels) from the smaller particle diameter side using a particle size distribution obtained by measurement with a laser diffraction particle size distribution analyzer (for example, LA-700 manufactured by HORIBA, Ltd.); and defining the particle diameter at a cumulative percentage of 50% relative to all particles as a volume-average particle diameter D50v. The volume-average particle diameters of the particles in other dispersions are also measured in the same manner.

—Flat Color Material—

The ratio between the average length in the major axis direction and the average length in the thickness direction of the flat color material (average length in the major axis direction/average length in the thickness direction) is preferably 5 or more and 200 or less, more preferably 10 or more and 100 or less, and still more preferably 10 or more and 70 or less. The average length in the major axis direction of the flat color material is preferably 1 μm or more and 20 μm or less, and more preferably 3 μm or more and 10 μm or less.

The measurement of the average length in the major axis direction and the average length in the thickness direction of the flat color material refers to values measured by the following method.

Form a toner image by fixing the toner on a recording medium such as paper with a toner placed amount of 3 g/m$^2$ to orient the planar direction of the flat color material contained in the toner along the planar direction of the recording medium. Embed the toner image with a bisphenol A-type liquid epoxy resin and a curing agent, then produce a sample for cutting. Next, cut the sample for cutting with a diamond knife and a cutter, for example, an ultramicrotome apparatus (UltoracutUCT, manufactured by Leica) to produce a sample for observation. Observe the sample for observation with a transmission electron microscope (TEM), and calculate each of the length in the major axis direction and the length in the thickness direction for 100 flat color materials. Calculate an arithmetic average value of the measured lengths in the major axis direction of the flat color materials and define it as the average length in the major axis direction. Calculate an arithmetic average value of the measured lengths of the flat color materials in the thickness direction and define it as the average length in the thickness direction. Regarding the magnification, observation is performed at a magnification at which about 1 to 10 glitter pigments are seen in one visual field.

The flat color material is preferably a glitter pigment.

The glitter pigment is a pigment exhibiting glitter properties. Examples of the glitter pigment include powders of metal such as aluminum, brass, bronze, nickel, stainless steel, and zinc; mica covered with titanium oxide, yellow iron oxide, or the like; flaky crystals or plate-like crystals of aluminosilicate, basic carbonate, barium sulfate, titanium oxide, bismuth oxychloride, or the like; flaky glass powder, metal-deposited flaky glass powder; and guanine crystals.

As the glitter pigment, a metal powder is preferable from the viewpoint of specular reflection intensity, a metal powder having a flat shape is more preferable from the viewpoint of higher specular reflection intensity, and aluminum is preferable from the viewpoint of easily obtaining a flat powder. That is, a flat aluminum powder is preferable as the glitter pigment. The surface of the metal powder may be covered with an acrylic resin, a polyester resin, or the like.

Examples of the flocculant include surfactants having the opposite polarity from the surfactant used as a dispersant added to the dispersion, inorganic metal salts, and bivalent or higher metal complexes. The use of a metal complex as the flocculant reduces the use amount of the surfactant and improves the charging characteristics.

The flocculant may be used in combination with an additive that forms a complex or similar bond with metal ions of the flocculant, as necessary. As the additive, a chelating agent is suitably used.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

Of these, an aluminum compound is preferably used as the flocculant.

The chelating agent may be a water-soluble chelating agent. Examples of the chelating agent include oxycarboxylic acids such as tartaric acid, citric acid, and gluconic acid, iminodiacetic acid (IDA), nitrilotriacetic acid (NTA), and ethylene diamine tetraacetic acid (ED TA).

The addition amount of the chelating agent is, for example, preferably 0.01 parts by mass or more and 5.0 parts by mass or less, and more preferably 0.1 parts by mass or more and less than 3.0 parts by mass relative to 100 parts by mass of the resin particles.

The dispersion medium contained in the dispersion in the first step is preferably an aqueous medium.

Examples of the aqueous medium include water such as distilled water and ion-exchange water, and alcohols. These medium may be used singly or in combination of two or more thereof.

The dispersion in the first step preferably contains a surfactant as a flocculant or a dispersant.

Examples of the surfactant include: anionic surfactants such as sulfate surfactants, sulfonate surfactants, phosphate surfactants, and soap surfactants; cationic surfactants such as amine salt surfactants and quaternary ammonium salt surfactants; nonionic surfactants such as polyethylene glycol surfactants, alkylphenol ethylene oxide adduct surfactants, and polyhydric alcohol surfactants. Of these, in particular, anionic surfactants and cationic surfactants may be used. The nonionic surfactant may be used in combination with an anionic surfactant or a cationic surfactant.

The surfactants may be used singly or in combination of two or more thereof.

In the first step, the solid content concentration of the dispersion is preferably 5 mass % or more and 30 mass % or less, more preferably 8 mass % or more and 25 mass % or less, and particularly preferably 11 mass % or more and 20 mass % or less, from the viewpoint of dispersibility of the polyester resin particles, the flat color material, and the like.

The number-average particle diameter of the first aggregated particles is 1 μm or more, and is preferably 1 μm or more and 8 μm or less, more preferably 2 μm or more and 6 μm or less, and still more preferably 3 μm or more and 5 μm or less, from the viewpoint of obtaining a toner that further reduces occurrence of gloss unevenness.

The number-average particle diameter of the first aggregated particles is measured as follows: drawing a number-based cumulative distribution in divided particle size ranges (channels) from the smaller particle diameter side using a particle size distribution obtained by measurement with a laser diffraction particle size distribution analyzer (for example, LA-700 manufactured by HORIBA, Ltd.); and defining the particle diameter at a cumulative percentage of 50% relative to all particles as the number-average particle diameter.

(Second Step)

The second step is a step of adding a non-crystalline resin particle dispersion in which non-crystalline resin particles are dispersed to the first aggregated particle dispersion to cause the non-crystalline resin particles to be attached to the first aggregated particles and obtain second aggregated particles.

Specifically, the attachment in the second step is performed as follows, for example. After a dispersion stabilizer is added as necessary, heat the non-crystalline resin particles to a temperature equal to the glass transition temperature of the non-crystalline resin particles (specifically, for example, a temperature equal to or lower than the glass transition temperature of the non-crystalline resin particles) to allow the non-crystalline resin particles to be attached to the surfaces of the first aggregated particles and form the second aggregated particles.

Then, adjust the pH of the dispersion containing the second aggregated particles and stop the progress of aggregation.

In the second step, for example, the heating may be performed at room temperature (for example, 25° C.) while stirring the first aggregated particle dispersion with a rotary shearing-type homogenizer, after adding a dispersion stabilizer as necessary.

In the second step, a flocculant may be added, but it is preferable not to add a flocculant from the viewpoint of aggregation uniformity.

—Non-Crystalline Resin Particle Dispersion—

The non-crystalline resin particles are dispersed in the non-crystalline resin particle dispersion.

Here, the non-crystalline resin particles refer to particles containing a non-crystalline resin as a main component.

Here, the particles containing a non-crystalline resin as a main component refer to particles in which the content of the non-crystalline resin is 90 mass % or more relative to the entire particles.

The non-crystalline resin particle dispersion contains a dispersion medium that disperses the non-crystalline resin particles.

The dispersion medium contained in the non-crystalline resin particle dispersion is preferably an aqueous medium.

Examples of the aqueous medium include water such as distilled water and ion-exchange water, and alcohols. These medium may be used singly or in combination of two or more thereof.

Examples of the non-crystalline resin include vinyl resins including homopolymers of monomers such as styrenes (e.g., styrene, p-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), olefins (e.g., ethylene, propylene, and butadiene), and copolymers of two or more of these monomers.

These non-crystalline resins may be used singly or in combination of two or more thereof.

As the non-crystalline resin, a non-crystalline polyester resin is suitable.

The non-crystalline polyester resin included in the non-crystalline resin particles has the same definition as the non-crystalline polyester described above, and its preferable range is also the same.

The non-crystalline resin particle dispersion satisfies the following Formulas (1) to (3).

$$-0.01\times A-0.25\times B+9.2\leq pH \text{ or } pH\leq -0.01\times A-0.25\times B+10.0 \quad \text{Formula (1)}$$

$$100\text{ nm}\leq A \text{ or } A\leq 250\text{ nm} \quad \text{Formula (2)}$$

$$5\text{ mgKOH/g}\leq B \text{ or } B\leq 20\text{ mgKOH/g} \quad \text{Formula (3)}$$

In Formulas (1) to (3), A is a particle diameter of the non-crystalline resin particles, B is an acid value of the non-crystalline resin, and pH is a pH of the non-crystalline resin particle dispersion.

The non-crystalline resin particle dispersion preferably satisfies Formulas (1-2) to (3-2), and more preferably satisfies Formulas (1-3) to (3-3), from the viewpoint of obtaining a method for producing a toner by which occurrence of gloss unevenness is further reduced when an image having a high image density is formed after images are continuously formed in a high-temperature and high-humidity environment and then the image forming apparatus is stopped for a certain period of time.

$$-0.01\times A-0.25\times B+9.5\leq pH\leq -0.01\times A-0.25\times B+10.0 \quad \text{Formula (1-2)}$$

$$100\text{ nm}\leq A \text{ or } A\leq 200\text{ nm} \quad \text{Formula (2-2)}$$

$$5\text{ mgKOH/g}\leq B\leq 15\text{ mgKOH/g} \quad \text{Formula (3-2)}$$

$$-0.01\times A-0.25\times B+9.5\leq pH\leq -0.01\times A-0.25\times B+9.8 \quad \text{Formula (1-3)}$$

$$100\text{ nm}\leq A\leq 180\text{ nm} \quad \text{Formula (2-3)}$$

$$7\text{mgKOH/g}\leq B\leq 15\text{ mgKOH/g} \quad \text{Formula (3-3)}$$

In Formulas (1-2) to (3-2) and Formulas (1-3) to (3-3), A is a particle diameter of the non-crystalline resin particles, B is an acid value of the non-crystalline resin, and pH is a pH of the non-crystalline resin particle dispersion.

The particle diameter (A) of the non-crystalline resin particles is measured in the same manner as in the measurement of the volume-average particle diameter of the polyester resin particles described above.

The acid value of the non-crystalline resin (B) is measured in accordance with the method (potentiometric titration method) specified in JIS K0070:1992.

The pH of the non-crystalline resin particle dispersion is a pH when the temperature of the non-crystalline resin particle dispersion is 20° C.

The pH of the non-crystalline resin particle dispersion is measured with a pH measuring device (for example, product name Seven2Go manufactured by METTLER).

When the non-crystalline resin particle dispersion is added to the first aggregated particle dispersion two or more times, the particle diameter (A) of the non-crystalline resin particles, the acid value (B) of the non-crystalline resin, and the pH of the non-crystalline resin particle dispersion are the arithmetic mean values of all the non-crystalline resin particle dispersions added to the first aggregated particle dispersion.

In the method for producing a toner according to the exemplary embodiment, the pH of the non-crystalline resin particle dispersion is 3.0 or more and 6.5 or less.

The pH of the non-crystalline resin particle dispersion has the same definition as the pH of the non-crystalline resin particle dispersion in Formula (1), Formula (1-2), and Formula (1-3), and its measurement method is also the same.

The pH of the non-crystalline resin particle dispersion is preferably 3.5 or more and 6.5 or less, more preferably 4.0 or more and 5.5 or less, and still more preferably 4.0 or more and 5.0 or less, from the viewpoint of obtaining a method for producing a toner by which occurrence of gloss unevenness is further reduced when an image having a high image density is formed after images are continuously formed in a high-temperature and high-humidity environment and then the image forming apparatus is stopped for a certain period of time.

—Addition Mode of Non-Crystalline Resin Particle Dispersion—

In the second step, the non-crystalline resin particle dispersion is preferably added two or more times, more preferably added two or more times and five or less times, still more preferably added two or three times, and particularly preferably added two times to the first aggregated particle dispersion.

By adding the non-crystalline resin particle dispersion two or more times to the first aggregated particle dispersion in the second step, the concentration of the non-crystalline resin particles in the dispersion containing the first aggregated particles and the non-crystalline resin particles is reduced, and aggregation of the non-crystalline resin particles is more likely to be reduced. This further reduces generation of white beads. Thus, the method for producing a toner can obtain a toner that reduces occurrence of gloss unevenness when an image having a high image density is formed after images are continuously formed under a high-temperature and high-humidity environment and then the image forming apparatus is stopped for a certain period of time.

—Solid Content Concentration of Non-Crystalline Resin Particle Dispersion—

The solid content concentration of the non-crystalline resin particle dispersion preferably satisfies Formula (4).

solid content concentration of non-crystalline resin particle dispersion added for nth($n$)th time<solid content concentration of non-crystalline resin particle dispersion added for($n$+1)th time     Formula (4)

wherein n is an integer of 1 or more.

The solid content concentration of the non-crystalline resin particle dispersion indicates the content of the non-crystalline resin particles contained in the non-crystalline resin particle dispersion relative to the mass of the non-crystalline resin particle dispersion.

When the solid content concentration of the non-crystalline resin particle dispersion satisfies Formula (4), the non-crystalline resin particles can be attached to the first aggregated particles in a stepwise manner. Thus, aggregation of the non-crystalline resin particles is more likely to be reduced, and generation of white beads is further reduced.

The solid content concentration of the non-crystalline resin particle dispersion preferably satisfies Formula (5).

2 mass %≤(solid content concentration of non-crystalline resin particle dispersion added for ($n$+1) th time)−(solid content concentration of non-crystalline resin particle dispersion added for ($n$)th time)≤20 mass %     Formula (5)

wherein n is an integer of 1 or more.

With the solid content concentration of the non-crystalline resin particle dispersion satisfying Formula (5), a large increase in the concentration of the non-crystalline resin particles in the dispersion containing the first aggregated particles and the non-crystalline resin particles is reduced, and the non-crystalline resin particles can be attached to the first aggregated particles in a more stepwise manner. Thus, aggregation of the non-crystalline resin particles is further likely to be reduced, and generation of white beads is further reduced.

The solid content concentration of the non-crystalline resin particle dispersion more preferably satisfies Formula (5-2), and still more preferably satisfies Formula (5-3), from the viewpoint of obtaining a method for producing a toner by which occurrence of gloss unevenness is particularly reduced when an image having a high image density is formed after images are continuously formed in a high-temperature and high-humidity environment and then the image forming apparatus is stopped for a certain period of time.

2 mass %≤(solid content concentration of non-crystalline resin particle dispersion added for($n$+1)th time)−(solid content concentration of non-crystalline resin particle dispersion added for($n$)th time)≤18 mass %     Formula (5-2)

2 mass %≤(solid content concentration of non-crystalline resin particle dispersion added for ($n$+1) th time)−(solid content concentration of non-crystalline resin particle dispersion added for ($n$)th time)≤15 mass %     Formula (5-3)

In Formula (5-2) and Formula (5-3), n is an integer of 1 or more.

The solid content concentration of the non-crystalline resin particle dispersion is preferably 5 mass % or more and 40 mass % or less, more preferably 5 mass % or more and 35 mass % or less, and still more preferably 10 mass % or more and 35 mass % or less.

The pH of the first aggregated particle dispersion is preferably lower than the pH of the non-crystalline resin particle dispersion.

When the pH of the first aggregated particle dispersion and the pH of the non-crystalline resin particle dispersion satisfy the above-described relationship, aggregation of the non-crystalline resin can be reduced and attachment to primary particle surfaces becomes nearly uniform when the non-crystalline particles are added, and thus the method for producing a toner can obtain a toner that reduces occurrence of gloss unevenness when an image having a high image density is formed after images are continuously formed in a high-temperature and high-humidity environment and then the image forming apparatus is stopped for a certain period of time.

(Third Step)

The third step is a step of heating a second aggregated particle dispersion in which the second aggregated particles are dispersed to cause the second aggregated particles to coalesce.

In the third step, the dispersion in which the second aggregated particles are dispersed is heated to, for example, a temperature equal to or higher than the glass transition temperatures of the polyester resin particles and the non-crystalline resin particles (for example, a temperature of 30° C. to 50° C. higher than the glass transition temperatures of the resin particles and the shell resin particles) to cause the second aggregated particles to coalesce and form toner particles.

In the third step, the resins are united at a temperature equal to or higher than the glass transition temperatures of the non-crystalline resin particles and the polyester resin particles. Thereafter, cooling is performed to obtain toner particles.

The third step is preferably performed in a stirring tank with an opening, the stirring tank containing the second aggregated particles dispersion, in which coalescence of the second aggregated particles is performed in a state where a gas having an air volume of 5 L/(min·$m^3$) or more is blown per unit amount of the second aggregated particle dispersion in the stirring tank.

When the second aggregated particle dispersion contains a low molecular weight compound, aggregation of the white beads is likely to be promoted. By performing the third step as described above, volatilization of the low molecular weight compound contained in the second aggregated particle dispersion is promoted, and aggregation of the white beads is reduced, thus the method for producing a toner can obtain a toner that reduces occurrence of gloss unevenness when an image having a high image density is formed after images are continuously formed in a high-temperature and high-humidity environment and then the image forming apparatus is stopped for a certain period of time.

The air volume is more preferably 5 L/(min·m$^3$) or more and 150 L/(min·m$^3$) or less, still more preferably 10 L/(min·m$^3$) or more and 100 L/(min·m$^3$) or less, and particularly preferably 20 L/(min·m$^3$) or more and 100 L/(min·m$^3$) or less per unit amount of the second aggregated particles dispersion.

Core-shell type toner particles are obtained through the above steps.

Here, after completion of the third step, the toner particles formed in the solution are subjected to a known washing step, solid-liquid separation step, and drying step to obtain dried toner particles.

In the washing step, it is preferable to sufficiently perform displacement washing with ion-exchange water from the viewpoint of chargeability. The solid-liquid separation step is not limited but preferably includes suction filtration, pressure filtration, or the like in view of productivity. The drying step is not limited either but preferably includes, for example, freeze-drying, flush drying, fluidized drying, or vibration fluidized drying in view of productivity.

The method for producing an electrostatic charge image development toner according to the exemplary embodiment preferably includes a step of adding an external additive to the obtained toner particles.

The addition is preferably performed with, for example, a V blender, a Henschel mixer, or a Loedige mixer. Coarse particles in the toner may be removed with a vibratory screening machine, a wind-power screening machine, or the like as necessary.

Examples of the external additive used in the step of adding an external additive include inorganic particles according to the description of the external additive that may be included in the toner, which is described below.

<Electrostatic Charge Image Development Toner>

Hereinafter, each component contained in the toner will be described in detail.

The toner according to the exemplary embodiment includes toner particles and, as necessary, an external additive.

The toner particles preferably contain a binder resin and a flat color material, and as necessary, a release agent, a colorant other than the flat color material, and other additives.

(Binder Resin)

The binder resin contains a polyester resin and a non-crystalline resin.

The polyester resin and the non-crystalline resin contained in the binder resin have the same definitions as the above-described polyester resin and non-crystalline resin, and their preferable ranges are also the same.

The content of the binder resin is preferably 40 mass % or more and 95 mass % or less, more preferably 50 mass % or more and 90 mass % or less, and still more preferably 60 mass % or more and 85 mass % or less relative to the entire toner particles.

(Flat Color Material)

The flat color material contained in the toner particles has the same definition as the flat color material described above, and its preferable range is also the same.

The content of the glitter pigment in the toner particles is, for example, 1 mass % or more and 50 mass % or less, 5 mass % or more and 50 mass % or less, or 10 mass % or more and 30 mass % or less relative to the entire toner particles.

(Release Agent)

The toner particles may contain a release agent as necessary.

Examples of the release agent include: hydrocarbon waxes; natural waxes such as carnauba wax, rice wax, and candelilla wax; synthetic or mineral-petroleum waxes such as montan wax; and ester waxes such as fatty acid esters and montanic acid esters. The release agent is not limited to these waxes.

The melting temperature of the release agent is preferably 50° C. or more and 110° C. or less, and more preferably 60° C. or more and 100° C. or less.

The melting temperature is determined from a DSC curve obtained by differential scanning calorimetry (DSC) in accordance with "melting peak temperature" described in the method for obtaining a melting temperature in JIS K 7121:1987 "Testing methods for transition temperatures of plastics".

The content of the release agent is, for example, preferably 1 mass % or more and 20 mass % or less, and more preferably 5 mass % or more and 15 mass % or less relative to the entire toner particles.

(Colorant Other than Flat Color Material)

The toner particles may contain a colorant other than the flat color material (hereinafter also simply referred to as "colorant") as necessary.

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, and various dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These colorants may be used singly or in combination of two or more thereof.

The colorant may be a surface-treated colorant as necessary and may be used in combination with a dispersant. A plurality of types of colorants may be used in combination.

The content of the colorant is, for example, preferably 1 mass % or more and 30 mass % or less, and more preferably 3 mass % or more and 15 mass % or less relative to the entire toner particles.

—Other Additives—

Examples of the other additives include well-known additives such as magnetic substances, charge control agents, and inorganic powders. These additives are contained in the toner particles as internal additives.

—Characteristics, Etc. Of Toner Particle—

Details of the toner particles contained in the toner obtained by the method for producing a toner according to the exemplary embodiment will be described below.

The toner particles according to the exemplary embodiment are toner particles having a core-shell structure.

The toner particles according to the exemplary embodiment preferably include for example, a core part containing a binder resin and a flat color material (containing other additives such as a colorant and a release agent as necessary) and a covering layer containing a binder resin.

The volume-average particle diameter (D50v) of the toner particles is preferably 2 μm or more and 20 μm or less, and more preferably 4 μm or more and 15 μm or less.

The average particle diameters and the particle size distribution indexes of the toner particles are measured with Coulter Multisizer II (manufactured by Beckman Coulter, Inc.) by using ISOTON-II (manufactured by Beckman Coulter, Inc.) as an electrolytic solution.

In the measurement, 0.5 mg or more and 50 mg or less of a measurement sample is added to 2 ml of a 5% aqueous solution of a surfactant (sodium alkylbenzene sulfonate is preferable) as a dispersant. The mixture is added to 100 ml or more and 150 ml or less of the electrolytic solution.

The electrolytic solution in which the sample is suspended is subjected to a dispersion treatment for one minute with an ultrasonic disperser, and the particle size distribution of particles having a particle diameter of 2 μm or more and 60 μm or less is measured with a Coulter Multisizer II using an aperture having an aperture diameter of 100 μm. The number of sampled particles is 50,000.

The volume-based cumulative distribution and number-based cumulative distribution of the particle diameter are drawn from the smaller diameter side for the particle size ranges (channels) divided based on the measured particle size distribution, in which particle diameters at a cumulative percentage of 16% are defined as a volume-average particle diameter D16v and a number-average particle diameter D16p, particle diameters at a cumulative percentage of 50% are defined as a volume-average particle diameter D50v and a number-average particle diameter D50p, and particle diameters at a cumulative percentage of 84% are defined as a volume-average particle diameter D84v and a number-average particle diameter D84p.

With these values, the volume-average particle size distribution index (GSDv) is calculated as $(D84v/D16v)^{1/2}$, and the number-average particle size distribution index (GSDp) is calculated as $(D84p/D16p)^{1/2}$.

The average circularity of the toner particles is preferably 0.94 or more and 1.00 or less, and more preferably 0.95 or more and 0.98 or less.

The average circularity of the toner particles is obtained from (circle equivalent circumference)/(circumference) [(circumference of circle having the same projected area as particle image)/(circumference of projected particle image)]. Specifically, the average circularity of the toner particles is a value measured by the following method.

First, collect the toner particles to be measured by suction to form a flat flow, and capture instantly their particle image as a still image with stroboscopic flash, then analyze the particle image with a flow particle image analyzer (FPIA-3000 manufactured by Sysmex Corporation). The number of samples used to obtain the average circularity is 3,500.

When the toner has an external additive, disperse the toner (developer) to be measured in water containing a surfactant and then perform ultrasonic treatment to obtain toner particles from which the external additive has been removed.

(External Additive)

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot SiO_2$, $CaCO_3$, $MgClO_3$, $BaSO_4$, and $MgSO_4$.

The surfaces of the inorganic particles as the external additive are preferably subjected to a hydrophobization treatment. The hydrophobization treatment is performed, for example, by immersing the inorganic particles in a hydrophobizing agent. The hydrophobizing agent is not limited, and examples thereof include a silane coupling agent, a silicone oil, a titanate coupling agent, and an aluminum coupling agent. These hydrophobizing agents may be used singly or in combination of two or more thereof.

The amount of the hydrophobizing agent is typically, for example, 1 part by mass or more and 10 parts by mass or less per 100 parts by mass of the inorganic particles.

Examples of the external additive include resin particles (resin particles such as polystyrene, polymethyl methacrylate (PMMA), and a melamine resin) and a cleaning activator (e.g., metal salts of higher fatty acids typified by zinc stearate, and fluorine high molecular weight particles).

The addition amount of the external additive is, for example, preferably 0.01 mass % or more and 5 mass % or less, and more preferably 0.01 mass % or more and 2.0 mass % or less relative to the toner particles.

<Electrostatic Charge Image Developer>

An electrostatic charge image developer according to the exemplary embodiment includes at least the toner according to the exemplary embodiment.

The electrostatic charge image developer according to the exemplary embodiment may be a one-component developer containing only the toner according to the exemplary embodiment or may be a two-component developer in which the toner and a carrier are mixed.

The carrier is not limited, and a known carrier may be used. Examples of the carrier include: a covered carrier including a core material made of magnetic powder and a covering resin that covers the surface of the core material; a magnetic powder-dispersed carrier in which a magnetic powder is dispersed and blended in matrix resin; and a resin-impregnated carrier in which porous magnetic powder is impregnated with resin.

The magnetic powder-dispersed carrier and the resin-impregnated carrier may be carriers in which the surfaces of carrier-forming particles serving as core materials are covered with a covering resin.

Examples of the magnetic powder include powders made of magnetic metal such as iron, nickel, or cobalt, and powders made of magnetic oxide such as ferrite or magnesium.

Examples of the covering resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin having an organosiloxane bond or a modified product thereof, a fluororesin, polyester, polycarbonate, phenolic resin, and an epoxy resin.

The covering resin and the matrix resin may contain other additives such as conductive particles.

Examples of the conductive particles include particles made of metal such as gold, silver, or copper, carbon black, titanium oxide, zinc oxide, tin oxide, barium sulfate, aluminum borate, and potassium titanate.

To cover the surface of the core material with a covering resin, for example, a covering method using a covering layer forming solution in which the covering resin and various additives as necessary are dissolved in an appropriate solvent may be used. The solvent is not limited and may be selected in consideration of the covering resin to be used, application suitability, and the like.

Specific examples of the resin covering method include an immersion method including immersing the core material in a covering layer forming solution, a spray method including spraying a covering layer forming solution to the surface of the core material, a fluidized bed method including spraying a covering layer forming layer while the core material is floating in air flow, and a kneader-coater method including mixing the core material of the carrier and a covering layer forming solution in a kneader-coater and then removing a solvent.

The mixing ratio (mass ratio) between the toner and the carrier in the two-component developer is preferably toner: carrier=1:100 to 30:100, and more preferably 3:100 to 20:100.

<Image Forming Apparatus, Image Forming Method>

An image forming apparatus and an image forming method according to an exemplary embodiment will be described.

The image forming apparatus according to the exemplary embodiment includes an image holding member, a charging unit that charges the surface of the image holding member, an electrostatic charge image forming unit that forms an electrostatic charge image on the charged surface of the image holding member, a developing unit that contains an electrostatic charge image developer and develops, as a toner image, the electrostatic charge image formed on the surface of the image holding member by using the electrostatic charge image developer, a transfer unit that transfers the toner image formed on the surface of the image holding member onto a surface of a recording medium, and a fixing unit that fixes the toner image transferred onto the surface of the recording medium. The electrostatic charge image developer according to the exemplary embodiment is used as the electrostatic charge image developer.

An image forming method (the image forming method according to the exemplary embodiment) is carried out in the image forming apparatus according to the exemplary embodiment, the method including a charging step of charging the surface of the image holding member, an electrostatic charge image forming step of forming an electrostatic charge image on the charged surface of the image holding member, a developing step of developing, as a toner image, the electrostatic charge image formed on the surface of the image holding member by using the electrostatic charge image developer according to the exemplary embodiment, a transfer step of transferring the toner image formed on the surface of the image holding member onto a surface of a recording medium, and a fixing step of fixing the toner image transferred onto the surface of the recording medium.

The image forming apparatus according to the exemplary embodiment may be known image forming apparatuses such as: a direct transfer apparatus that directly transfers a toner image formed on the surface of an image holding member onto a recording medium; an intermediate transfer apparatus that primarily transfers a toner image formed on the surface of an image holding member onto the surface of an intermediate transfer body and secondarily transfers the toner image transferred onto the surface of the intermediate transfer body onto a surface of a recording medium; an apparatus including a cleaning unit that cleans the surface of an image holding member before charging after transfer of a toner image; and an apparatus including a charge eliminating unit that eliminates charges by irradiating the surface of an image holding member with charge eliminating light before charging after transfer of a toner image.

When the image forming apparatus according to the exemplary embodiment is an intermediate transfer apparatus, the transfer unit may include, for example, an intermediate transfer body in which a toner image is to be transferred onto the surface, a primary transfer unit that primarily transfers the toner image on the surface of the image holding member onto the surface of the intermediate transfer body, and a secondary transfer unit that secondarily transfers the toner image on the surface of the intermediate transfer body onto a surface of a recording medium.

In the image forming apparatus according to the exemplary embodiment, for example, a part including the developing unit may have a cartridge structure (process cartridge) detachably attached to the image forming apparatus. As the process cartridge, for example, a process cartridge that contains the electrostatic charge image developer according to the exemplary embodiment and includes a developing unit is suitably used.

The image forming apparatus according to the exemplary embodiment may be a tandem image forming apparatus in which an image forming unit that forms a glitter toner image (that is, a toner image formed by the toner according to the exemplary embodiment) and at least one image forming unit that forms a toner image of a color different from glitter are disposed in parallel, or may be an image forming apparatus including only an image forming unit that forms a glitter toner image.

Hereinafter, an example of the image forming apparatus according to the exemplary embodiment will be described, but the present invention is not limited to the example. In the following description, main parts illustrated in the drawings will be described, and description of other parts will be omitted.

FIG. 1 is a schematic configuration diagram illustrating the image forming apparatus according to the exemplary embodiment, which is a five-tandem intermediate transfer image forming apparatus.

The image forming apparatus illustrated in FIG. 1 includes first to fifth electrophotographic image forming units 10G, 10Y, 10M, 10C, and 10K (image forming units) that respectively output glitter (G), yellow (Y), magenta (M), cyan (C), and black (K) color images based on color-separated image data. The image forming units (hereinafter they may also be simply referred to as "units") 10G, 10Y, 10M, 10C, and 10K are arranged apart from each other at predetermined intervals in the horizontal direction. These units 10G, 10Y, 10M, 10C, and 10K may be process cartridges detachably attached to the image forming apparatus.

An intermediate transfer belt (an example of the intermediate transfer body) 20 is disposed below the units 10G, 10Y, 10M, 10C, and 10K to extend through each unit. The intermediate transfer belt 20 is wound around a drive roller 22, a support roller 23, and a counter roller 24 that are disposed in contact with the inner surface of the intermediate transfer belt 20 and runs in the direction from the first unit 10G toward the fifth unit 10K. On the image holding surface side of the intermediate transfer belt 20, an intermediate transfer belt cleaning device 21 is provided facing the drive roller 22.

Developing devices (examples of developing units) 4G, 4Y, 4M, 4C, and 4K of the units 10G, 10Y, 10M, 10C, and 10K are respectively supplied with glitter, yellow, magenta, cyan, and black toners contained in the toner cartridges 8G, 8Y, 8M, 8C, and 8K.

Since the first to fifth units 10G, 10Y, 10M, 10C, and 10K have the same configuration and operation, the first unit 10G disposed upstream in the running direction of the intermediate transfer belt that forms a glitter image will be described as a representative example.

The first unit 10G has a photoreceptor 1G serving as an image holding member. The photoreceptor 1G is surrounded by, in sequence, a charging roller (an example of the charging unit) 2G that charges the surface of the photoreceptor 1G to a predetermined potential, an exposure device (an example of the electrostatic charge image forming unit) 3G that exposes the charged surface to a laser beam based on a color-separated image signal to form an electrostatic charge image, a developing device (an example of the developing unit) 4G that supplies a toner to the electrostatic charge image to develop the electrostatic charge image, a primary transfer roller (an example of the primary transfer unit) 5G that transfers the developed toner image onto the intermediate transfer belt 20, and a photoreceptor cleaning device (an example of the cleaning unit) 6G that removes toner remaining on the surface of the photoreceptor 1G after the primary transfer.

The primary transfer roller 5G is disposed on the inner side of the intermediate transfer belt 20 to face the photoreceptor 1G. The primary transfer rollers 5G, 5Y, 5M, 5C, and 5K in the units are connected to respective bias power supplies (not illustrated) that apply a primary transfer bias. Each bias power supply varies a transfer bias to be applied to each primary transfer roller under the control of a control unit (not illustrated).

Hereinafter, an operation of the first unit 10G in forming a glitter image will be described.

First, prior to the operation, the charging roller 2G charges the surface of the photoreceptor 1G to a potential of −600 V to −800 V.

The photoreceptor 1G includes a conductive (for example, a volume resistivity of $1\times10^{-6}$ Ω·cm or less at 20° C.) base material and a photosensitive layer stacked on the base material. The photosensitive layer usually has high resistance (resistance of a common resin), but has a property that irradiation with a laser beam changes the specific resistance of a region of the photosensitive layer irradiated with the laser beam. For this, the charged surface of the photoreceptor 1G is irradiated with a laser beam from the exposure device 3G according to image data for glitter sent from the control unit (not illustrated). This causes an electrostatic charge image with a glitter image pattern to be formed on the surface of the photoreceptor 1G.

The electrostatic charge image is an image formed on the surface of the photoreceptor 1G through charging, and it is a so-called negative latent image formed when the specific resistance of an irradiated part of the photosensitive layer is reduced by the laser beam from the exposure device 3G, charges on the surface of the photoreceptor 1G flow, whereas charges in a part that has not been irradiated with the laser beam remain.

The electrostatic charge image formed on the photoreceptor 1G rotates up to a predetermined developing position as the photoreceptor 1G runs. At this developing position, the electrostatic charge image on the photoreceptor 1G is developed and visualized as a toner image by the developing device 4G.

The developing device 4G contains, for example, an electrostatic charge image developer containing at least glitter toner (that is, the toner according to the exemplary embodiment) and a carrier. The glitter toner is triboelectrically charged by being stirred in the developing device 4G, and is held on a developer roller (an example of a developer holding body) having charges with the same polarity (negative polarity) as the charges on the photoreceptor 1G. As the surface of the photoreceptor 1G passes by the developing device 4G, the glitter toner electrostatically adheres to the charge-eliminated latent image part on the surface of the photoreceptor 1G, and a latent image is developed by the glitter toner. The photoreceptor 1G on which the glitter toner image is formed continuously runs at a predetermined speed to convey the developed toner image on the photoreceptor 1G to a predetermined primary transfer position.

When the glitter toner image on the photoreceptor 1G is conveyed to the primary transfer position, a primary transfer bias is applied to the primary transfer roller 5G, an electrostatic force from the photoreceptor 1G toward the primary transfer roller 5G acts on the toner image, and the toner image on the photoreceptor 1G is transferred onto the intermediate transfer belt 20. The transfer bias applied at this time has the polarity (+) opposite to the polarity (−) of the toner. The transfer bias is controlled to, for example, +10 μA in the first unit 10G by the control unit (not illustrated).

The toner remaining on the photoreceptor 1G is removed and collected by the photoreceptor cleaning device 6G.

The primary transfer biases applied to the primary transfer rollers 5Y, 5M, 5C, and 5K in the second unit 10Y and the subsequent units are also controlled in the same manner as in the first unit.

In this manner, the intermediate transfer belt 20 on which the glitter toner image has been transferred in the first unit 10G is sequentially conveyed through the second to fifth units 10Y, 10M, 10C, and 10K, and the toner images of the respective colors are multiply transferred in a superimposed manner.

The intermediate transfer belt 20 onto which the toner images of the five colors have been multiply transferred through the first to fifth units reaches a secondary transfer part including the intermediate transfer belt 20, the counter roller 24 in contact with the inner surface of the intermediate transfer belt, and a secondary transfer roller (an example of the secondary transfer unit) 26 provided on the image holding surface side of the intermediate transfer belt 20. A recording paper (an example of the recording medium) P is fed to a gap between the secondary transfer roller 26 and the intermediate transfer belt 20 in contact with each other through a supply mechanism at a predetermined timing, and a secondary transfer bias is applied to the counter roller 24. The transfer bias applied at this time has the same polarity (−) as the polarity (−) of the toner. An electrostatic force from the intermediate transfer belt 20 toward the recording paper P acts on the toner image, whereby the toner image on the intermediate transfer belt 20 is transferred onto the recording paper P. The secondary transfer bias at this time is determined according to the resistance detected by a resistance detection unit (not illustrated) that detects the resistance of the secondary transfer part. The voltage for the secondary transfer bias is controlled.

After this, the recording paper P is sent to a pressure contact part (nip part) between a pair of fixing rollers in a fixing device (an example of the fixing unit) 28, and the toner image is fixed onto the recording paper P to form a fixed image.

Examples of the recording paper P onto which the toner image is transferred include plain paper used in electrophotographic copying machines, printers, and the like. Examples of the recording medium include OHP sheets in addition to the recording paper P.

To further improve the smoothness of the image surface after fixing, the recording paper P preferably has a smooth surface, and for example, coated paper obtained by coating the surface of plain paper with a resin or the like and art paper for printing are suitably used.

The recording paper P to which the color image has been fixed is sent toward an ejection part, and a series of color image forming operations ends.

<Process Cartridge, Toner Cartridge>

A process cartridge according to an exemplary embodiment will be described.

The process cartridge according to the exemplary embodiment is a process cartridge including a developing unit that contains the electrostatic charge image developer according to the exemplary embodiment and develops, as a toner image, an electrostatic charge image formed on the surface of an image holding member by using the electrostatic charge image developer. The process cartridge according to the exemplary embodiment is detachably attached to an image forming apparatus.

The process cartridge according to the exemplary embodiment is not limited to the above-described configuration, and it may include a developing device, and as necessary, at least one selected from other units, such as an image holding member, a charging unit, an electrostatic charge image forming unit, and a transfer unit, for example.

Hereinafter, an example of the process cartridge according to the exemplary embodiment will be described, but the process cartridge is not limited to this example. Main parts illustrated in the drawings will be described, and the description of other parts will be omitted.

Figure 2:
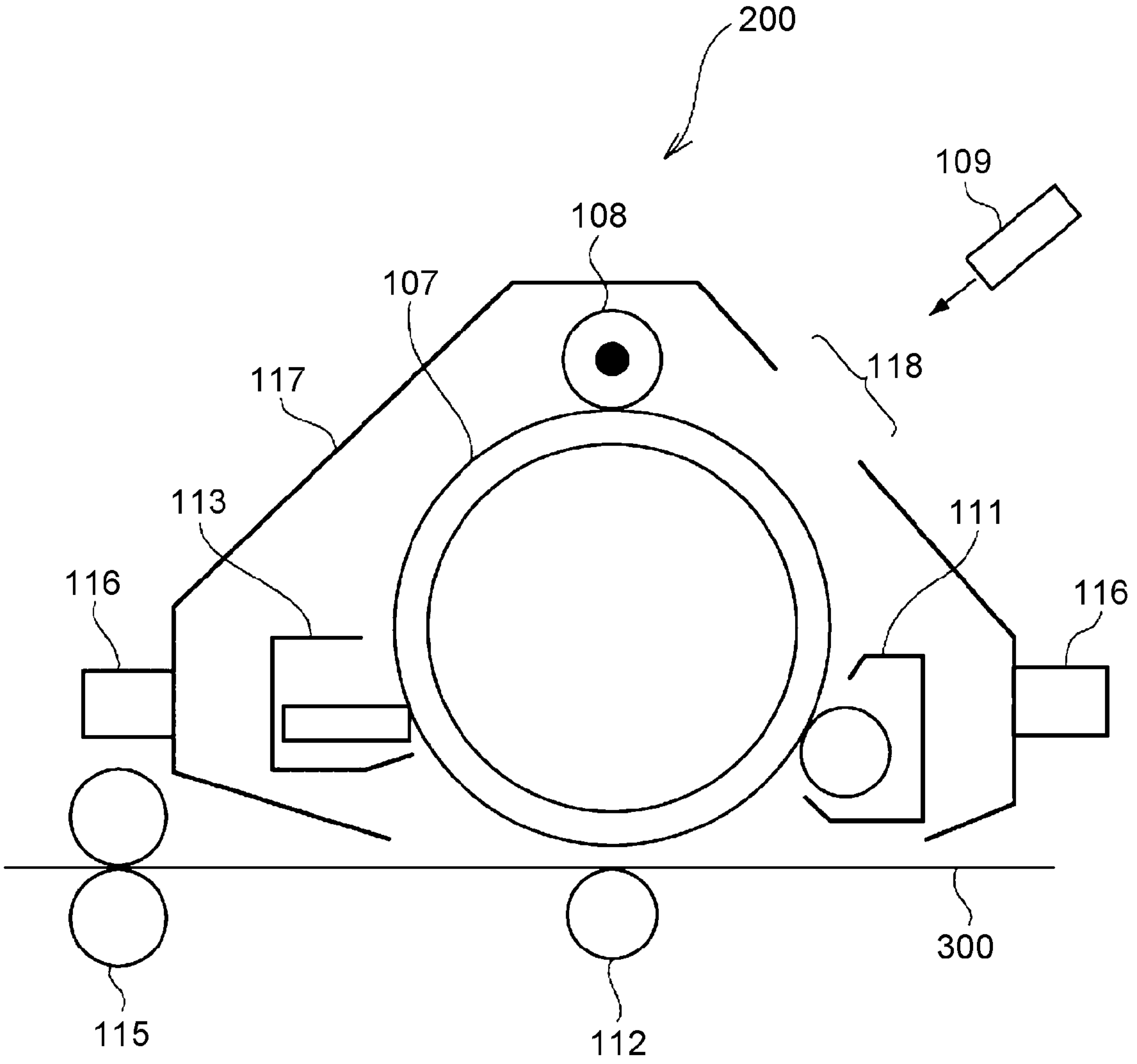
FIG. 2 is a schematic configuration diagram illustrating a process cartridge according to an exemplary embodiment.

FIG. 2 is a schematic diagram illustrating the process cartridge according to the exemplary embodiment.

A process cartridge 200 illustrated in FIG. 2 is a cartridge in which, for example, a photoreceptor 107 (an example of the image holding member), a charge roller 108 (an example of the charging unit) provided around the photoreceptor 107, a developing device 111 (an example of the developing unit), and a photoreceptor cleaning device 113 (an example of the cleaning unit) are integrally combined and held by a housing 117 provided with an installation rail 116 and an opening 118 for exposure.

In FIG. 2, the reference 109 denotes an exposure device (an example of the electrostatic charge image forming unit), the reference 112 denotes a transfer device (an example of the transfer unit), the reference 115 denotes a fixing device (an example of the fixing unit), and the reference 300 denotes recording paper (an example of the recording medium).

Next, a toner cartridge according to an exemplary embodiment will be described.

The toner cartridge according to the exemplary embodiment contains the toner according to the exemplary embodiment. The toner cartridge is detachably attached to an image forming apparatus. The toner cartridge contains toner for replenishment to be supplied to the developing unit in the image forming apparatus.

The image forming apparatus illustrated in FIG. 1 includes detachable toner cartridges 8Y, 8M, 8C, and 8K. The developing devices 4Y, 4M, 4C, and 4K are connected to the respective toner cartridges corresponding to the developing devices (colors) through toner supply pipes (not illustrated). When the toner contained in the toner cartridges run short, these toner cartridges are replaced.

EXAMPLES

Examples will be described below, but the present invention is not limited to these Examples at all. In the following description, all of "part" and "%" are based on mass unless otherwise specified.

<Dispersion Preparation Step>

(Preparation of Non-Crystalline Resin Particle Dispersion)

(Preparation of Non-Crystalline Resin Particle Dispersion 1)

Terephthalic acid: 30 parts by mole
Fumaric acid: 70 parts by mole
Bisphenol A ethylene oxide adduct: 5 parts by mole
Bisphenol A propylene oxide adduct: 95 parts by mole The above-described materials were charged into a flask equipped with a stirrer, a nitrogen introduction tube, a temperature sensor, and a rectifying column, the temperature was raised to 220° C. over 1 hour, and 1 part of titanium tetraethoxide was added to 100 parts of the above-described materials. The temperature was raised to 230° C. over 30 minutes while distilling off the generated water, the dehydration condensation reaction was continued at this temperature for 1 hour, and then the reaction product was cooled to obtain a non-crystalline polyester resin (weight-average molecular weight: 18,000, glass transition temperature: 59° C.).

To a container equipped with a temperature adjusting unit and a nitrogen substitution unit, 40 parts of methyl ethyl ketone and 25 parts of 2-butanol were put to form a mixed solvent, thereafter 100 parts of the non-crystalline polyester resin was gradually put thereinto and dissolved, and 5 parts of an anionic surfactant (NEOGEN RK, manufactured by Dai-ichi Kogyo Seiyaku Co., Ltd.) was put thereinto and stirred for 30 minutes. Subsequently, the inside of the container was replaced with dry nitrogen, and 800 parts of ion-exchange water was added dropwise to the mixture while stirring the mixture and maintaining the temperature at 40° C. to perform emulsification. After completion of the dropwise addition, the temperature of the emulsion was returned to 25° C., whereby a resin particle dispersion in which resin particles having a volume-average particle diameter of 180 nm were dispersed was obtained. Ion-exchange water was added to this resin particle dispersion to adjust the solid content concentration to 40%, whereby a non-crystalline resin particle dispersion 1 was obtained.

(Preparation of Non-Crystalline Resin Particle Dispersion 2)

To the non-crystalline polyester resin obtained by the procedure described for the non-crystalline resin particle dispersion 1, 60 parts of methyl ethyl ketone and 37 parts of 2-butanol were put to form a mixed solvent, thereafter 100 parts of the non-crystalline polyester resin was gradually put thereinto and dissolved, and 5 parts of an anionic surfactant (NEOGEN RK, manufactured by Dai-ichi Kogyo Seiyaku Co., Ltd.) was put thereinto and stirred for 30 minutes. Subsequently, the inside of the container was replaced with dry nitrogen, and 800 parts of ion-exchange water was added dropwise to the mixture while stirring the mixture and maintaining the temperature at 40° C. to perform emulsification. After completion of the dropwise addition, the temperature of the emulsion was returned to 25° C., whereby a resin particle dispersion in which resin particles having a volume-average particle diameter of 100 nm were dispersed was obtained. Ion-exchange water was added to this resin particle dispersion to adjust the solid content concentration to 40%, whereby a non-crystalline resin particle dispersion 2 was obtained.

(Preparation of Non-Crystalline Resin Particle Dispersion 3)

A non-crystalline resin particle dispersion 3 having a volume-average particle diameter of 90 nm of resin particles and a solid content concentration of 40% was obtained in the same manner as in the preparation of the non-crystalline resin particle dispersion 2 except that the addition amount of 2-butanol was changed to 39 parts.

(Preparation of Non-Crystalline Resin Particle Dispersion 4)

A non-crystalline resin particle dispersion 4 having a volume-average particle diameter of 250 nm of resin particles and a solid content concentration of 40% was obtained in the same manner as in the preparation of the non-crystalline resin particle dispersion 2 except that the addition amount of methyl ethyl ketone was changed to 35 parts and the addition amount of 2-butanol was changed to 24 parts.

(Preparation of Non-Crystalline Resin Particle Dispersion 5)

A non-crystalline resin 5 having a volume-average particle diameter of 260 nm of resin particles and a solid content concentration of 40% was obtained in the same manner as in the preparation of the non-crystalline resin particle dispersion 2 except that the addition amount of methyl ethyl ketone was changed to 34 parts and the addition amount of 2-butanol was changed to 22 parts.

(Preparation of Non-Crystalline Resin Particle Dispersion 6)

A non-crystalline polyester resin (weight-average molecular weight: 19,500, glass transition temperature: 61° C.) particle dispersion 6 having a volume-average particle diameter of 226 nm of resin particles and a solid content concentration of 40% was obtained in the same manner as in the preparation of the non-crystalline resin particle dispersion 1 except that the amount of fumaric acid added to a flask equipped with a stirrer, a nitrogen-introduction pipe, a temperature sensor, and a rectification column was changed from 70 parts by mole to 50 parts by mole, and 20 parts by mole of ethylene glycol was added to the flask equipped with a stirrer, a nitrogen-introduction pipe, a temperature sensor, and a rectification column in addition to the terephthalic acid, fumaric acid, bisphenol A ethylene oxide adduct, and bisphenol A propylene oxide adduct.

(Preparation of Non-Crystalline Resin Particle Dispersion 7)

A non-crystalline polyester resin (weight-average molecular weight: 19,600, glass transition temperature: 60° C.) particle dispersion 7 having a volume-average particle diameter of 225 nm of resin particles and a solid content concentration of 40% was obtained in the same manner as in the preparation of the non-crystalline resin particle dispersion 1 except that the amount of fumaric acid added to a flask equipped with a stirrer, a nitrogen-introduction pipe, a temperature sensor, and a rectification column was changed from 70 parts by mole to 45 parts by mole, and 25 parts by mole of ethylene glycol was added to the flask equipped with a stirrer, a nitrogen-introduction pipe, a temperature sensor, and a rectification column in addition to the terephthalic acid, fumaric acid, bisphenol A ethylene oxide adduct, and bisphenol A propylene oxide adduct.

(Preparation of Non-Crystalline Resin Particle Dispersion 8)

A non-crystalline polyester resin (weight-average molecular weight: 18,000, glass transition temperature: 60° C.) particle dispersion 8 having a volume-average particle diameter of 113 nm of resin particles and a solid content concentration of 40% was obtained in the same manner as in the preparation of the non-crystalline resin particle dispersion 1 except that the amount of fumaric acid added to a flask equipped with a stirrer, a nitrogen-introduction pipe, a temperature sensor, and a rectification column was changed from 70 parts by mole to 55 parts by mole, and 15 parts by mole of trimellitic acid was added to the flask equipped with a stirrer, a nitrogen-introduction pipe, a temperature sensor, and a rectification column in addition to the terephthalic acid, fumaric acid, bisphenol A ethylene oxide adduct, and bisphenol A propylene oxide adduct.

(Preparation of Non-Crystalline Resin Particle Dispersion 9)

A non-crystalline polyester resin (weight-average molecular weight: 18,000, glass transition temperature: 60° C.) particle dispersion 9 having a volume-average particle diameter of 112 nm of resin particles and a solid content concentration of 40% was obtained in the same manner as in the preparation of the non-crystalline resin particle dispersion 1 except that the amount of fumaric acid added to a flask equipped with a stirrer, a nitrogen-introduction pipe, a temperature sensor, and a rectification column was changed from 70 parts by mole to 50 parts by mole, and 20 parts by mole of trimellitic acid was added to the flask equipped with a stirrer, a nitrogen-introduction pipe, a temperature sensor, and a rectification column in addition to the terephthalic acid, fumaric acid, bisphenol A ethylene oxide adduct, and bisphenol A propylene oxide adduct.

The particle diameter of each non-crystalline resin particle dispersion, the acid value of the non-crystalline resin, and the pH of the non-crystalline resin particle dispersion are shown in Table 1.

(Preparation of Crystalline Polyester Resin Particle Dispersion)

Decanedioic acid: 81 parts

Hexanediol: 47 parts

The above-described materials were charged into a flask, the temperature was raised to 160° C. over 1 hour, and after it was confirmed that the reaction system was uniformly stirred, 0.03 parts of dibutyltin oxide was added. The temperature was raised to 200° C. over 6 hours while distilling off the generated water, and stirring was continued at 200° C. for 4 hours. Subsequently, the reaction liquid was cooled, solid-liquid separation was performed, and the solid was dried at a temperature of 40° C. under reduced pressure to obtain a crystalline polyester resin (weight-average molecular weight: 15,000, melting point: 64° C.).

The crystalline polyester in an amount of 50 parts, 2 parts of an anionic surfactant (NEOGEN RK manufactured by Dai-ichi Kogyo Seiyaku Co., Ltd.), and 200 parts of ion-exchange water were mixed, heated to 120° C., and sufficiently dispersed with a homogenizer (ULTRA-TURRAX T50 manufactured by IKA Werke GmbH & Co. KG). When the volume-average particle diameter reached 180 nm, the particles were collected, whereby a dispersion having a solid content of 20% was obtained.

(Preparation of Color Material Dispersion)

Aluminum pigment (2173EA manufactured by Toyo Aluminium K.K.): 100 parts

Anionic surfactant (NEOGEN R manufactured by Dai-ichi Kogyo Seiyaku Co., Ltd.): 1.5 parts Ion-exchange water: 900 parts After removal of the solvent from a paste of the aluminum pigment, the above-described materials were mixed and dispersed for 1 hour with an emulsification disperser Cavitron (CR1010, manufactured by Pacific Machinery & Engineering Co., Ltd.) to obtain a color material dispersion having a solid content of 10% in which a glitter pigment (aluminum pigment) was dispersed.

(Preparation of Release Agent Particle Dispersion)

Paraffin wax (manufactured by NIPPON SEIRO CO., LTD., FNP92, endothermic peak onset 81° C.): 45 parts Anionic surfactant (NEOGEN RK, manufactured by Dai-ichi Kogyo Seiyaku Co., Ltd): 5 parts Ion-exchange water: 200 parts The above-described materials were mixed, heated to 95° C., and dispersed with a homogenizer (ULTRA-TURRAX T50 manufactured by IKA Werke GmbH & Co. KG). Thereafter, the mixture was subjected to a dispersion treatment with a Manton-Gaulin High-Pressure Homogenizer (the Manton-Gaulin Company) to prepare a release agent particle dispersion (solid content concentration: 20%) in which a release agent was dispersed. The volume-average particle diameter of the release agent particles was 0.19 μm.

Example 1

(First Step)

Ion-exchange water: 500 parts

Non-crystalline resin particle dispersion 1: 170 parts

Crystalline polyester resin particle dispersion: 100 parts

Release agent particle dispersion: 25 parts

Color material particle dispersion: 50 parts

Anionic surfactant (TaycaPower): 3.0 parts

The above-described materials (hereinafter, also referred to as "charged materials") were put into a stirring tank with a jacket temperature control and then stirred for 5 minutes (hereinafter, also referred to as "dispersion stirring time").

After 0.1 N nitric acid aqueous solution was added to adjust the pH to 3.5, a polyaluminum chloride aqueous solution obtained by dissolving 2 parts of polyaluminum chloride (manufactured by Oji Paper Co., Ltd., 30% powder product) in 30 parts of ion-exchange water was added. The mixture was subjected to a dispersion treatment with a homogenizer, then heated to 45° C. and held until the number-average particle diameter became 4.6 μm, whereby a first aggregated particle dispersion in which first aggregated particles are dispersed.

(Second Step)

As the first addition of the non-crystalline resin particle dispersion, 100 parts of the non-crystalline resin particle dispersion 1 having a pH adjusted to 4.6 and a solid content concentration adjusted to 15 mass % was added to the stirring tank and held for 30 minutes. Next, as the second addition of the non-crystalline resin particle dispersion, 100 parts of the non-crystalline resin particle dispersion 1 having a pH adjusted to 4.8 and a solid content concentration adjusted to 30 mass % was added to the stirring tank and held for 30 minutes, whereby a second aggregated particle dispersion in which second aggregated particles were dispersed.

(Third Step)

Twenty parts of 10% NTA (nitrilotriacetic acid) metal salt aqueous solution (CHELEST 70, manufactured by CHELEST CORPORATION) was added to the stirring tank, and the pH was adjusted to 9.0 by adding 1 N sodium hydroxide aqueous solution. Subsequently, 1 part of an anionic surfactant (TaycaPower) was added to the mixture, and the mixture was heated to 85° C. with continuous stirring and held for 5 hours. Then, the mixture was cooled to 20° C. at a rate of 20° C./min to obtain a toner particle dispersion in which toner particles were dispersed.

The third step was performed in a stirring tank with an opening, in which gas (air) was blown in an amount of 15 L/(min·m$^3$)) per unit amount of the second aggregated particles dispersion in the stirring tank.

(Washing Step, Etc.)

Subsequently, the dispersion was sieved through a 20 μm mesh, repeatedly washed with water, and then dried in a vacuum dryer, whereby toner particles were obtained.

(Addition of External Additive)

The toner particles in an amount of 100 parts and 1.5 parts of hydrophobic silica (RY50 manufactured by Nippon Aerosil Co., Ltd.) were mixed by using a sample mill at a rotation speed 10,000 rpm for 30 seconds. Thereafter, the mixture was sieved with a vibration sieve having an opening of 45 μm, whereby a toner was obtained. The obtained toner had a volume-average particle diameter of 11.2 μm.

(Production of Carrier)

Spherical magnetite powder particles (volume-average particle diameter: 0.55 μm) in an amount of 500 parts were sufficiently stirred with a Henschel mixer, thereafter 5.0 parts of a titanate-based coupling agent was added thereto, the temperature was raised to 100° C., and the materials were mixed and stirred for 30 minutes, whereby spherical magnetite particles covered with a titanate-based coupling agent was obtained.

Subsequently, 6.25 parts of phenol, 9.25 parts of 35% formalin, 500 parts of the above-described magnetite particles, 6.25 parts of 25% aqueous ammonia, and 425 parts of water were put into a four neck flask then mixed and stirred. The mixture was allowed to react at 85° C. for 120 minutes while stirring and then cooled to 25° C., 500 parts of water were added thereto, thereafter the supernatant was removed, and the precipitate was washed with water. The obtained material was dried at 150° C. or more and 180° C. or less under reduced pressure, whereby a carrier having an average particle diameter of 35 mm was obtained.

(Production of Electrostatic Charge Image Developer)

The obtained carrier and toner were put into a V-blender at a ratio of toner:carrier=5:95 (mass ratio) and stirred for 20 minutes, whereby an electrostatic charge image developer was obtained.

Examples 2 to 24, Comparative Examples 1 and 2

Electrostatic charge image developers were obtained in the same manner as in Example 1, except that the conditions of the (First step), (Second step), and (Third step) were changed as shown in Table 1.

Example 25

An electrostatic charge image developer was obtained in the same manner as in Example 1 except that 5 parts of an aluminum pigment (2173EA manufactured by Toyo Aluminium K.K.) was added instead of 50 parts of the colorant particle dispersion in the charged materials in the first step.

<Evaluation of Gloss Unevenness>

As an image forming apparatus, "700Digital Color Press" manufactured by Fuji Film Business Innovation Corp. was prepared, and the developing device thereof was filled with the developer obtained in each Example and Comparative Example. An image having a solid image and an image density of 5% was printed on 50,000 sheets of OK topcoat paper (basis weight: 127) under an environment of 10° C. and 20% RH.

The environment was changed from 10° C. and 20% RH to 25° C. and 60% RH overnight with the image forming apparatus being stopped. Incident light at an incident angle of −45° was irradiated on five sheets of the solid image with a goniophotometer (spectral variable angle photometer GC 5000L manufactured by NIPPON DENSHOKU INDUSTRIES CO., LTD.), each of a reflectance X at a light-receiving angle of +30° and a reflectance Y at a light-receiving angle of −30° was measured for each image, and an arithmetic average value of the reflectances X of the respective images and an arithmetic average value of the reflectances Y of the respective images were calculated.

Each reflectance X and reflectance Y was measured for light having a range of 400 nm to 700 nm at intervals of 20 nm and defined as the average of the reflectances at respective wavelengths.

The values obtained by dividing the arithmetic average value of the reflectance X by the arithmetic average value of the reflectance Y (arithmetic average value of reflectance X÷arithmetic average value of reflectance Y. Hereinafter, also referred to as "Ratio (X/Y)") are shown in Table 1.

The higher the ratio (X/Y), the smaller the gloss unevenness, and the lower the ratio (X/Y), the larger the gloss unevenness.

TABLE 1-1

| | First step | | | Second step: Number of times of addition of non-crystalline resin particle dispersion — First time | | | | Second time | | | |
|---|---|---|---|---|---|---|---|---|---|---|---|
| | Number-average diameter of first aggregated particle (μm) | pH of first aggregated particle dispersion | Dispersion stirring time (min) | Type of non-crystalline resin particle dispersion | Addition amount of non-crystalline resin particle dispersion (part) | Solid content concentration of non-crystalline resin particle dispersion (mass %) | pH of non-crystalline resin particle dispersion | Type of non-crystalline resin particle dispersion | Addition amount of non-crystalline resin particle dispersion (part) | Solid content concentration of non-crystalline resin particle dispersion (mass %) | pH of non-crystalline resin particle dispersion |
| Example 1 | 4.6 | 3.5 | 5 | 1 | 100 | 15 | 4.6 | 1 | 100 | 30 | 4.8 |
| Example 2 | 4.6 | 3.5 | 5 | 1 | 100 | 15 | 4.6 | 1 | 100 | 30 | 4.8 |
| Example 3 | 4.8 | 3.8 | 5 | 2 | 100 | 20 | 5.2 | 2 | 80 | 30 | 5.3 |
| Example 4 | 4.8 | 3.8 | 10 | 3 | 100 | 20 | 5.2 | 3 | 80 | 30 | 5.3 |
| Example 5 | 4.8 | 3.8 | 10 | 4 | 100 | 20 | 3.7 | 4 | 80 | 30 | 4 |
| Example 6 | 4.8 | 3.8 | 5 | 5 | 100 | 20 | 3.7 | 5 | 80 | 30 | 4 |
| Example 7 | 4.4 | 4.2 | 20 | 7 | 150 | 20 | 6.2 | 7 | 50 | 30 | 6.3 |
| Example 8 | 4.4 | 4.2 | 20 | 6 | 150 | 20 | 6.3 | 6 | 50 | 30 | 6.3 |
| Example 9 | 4.9 | 3.2 | 30 | 8 | 200 | 10 | 3.6 | 8 | 100 | 25 | 3.8 |
| Example 10 | 4.9 | 2.9 | 30 | 9 | 200 | 10 | 3.5 | 9 | 100 | 25 | 3.7 |
| Comparative Example 1 | 4.9 | 3.2 | 30 | 8 | 200 | 10 | 2.8 | 8 | 100 | 25 | 2.9 |
| Example 11 | 4.9 | 3.2 | 30 | 8 | 200 | 10 | 3.1 | 8 | 100 | 25 | 3.2 |
| Example 12 | 4.4 | 4.2 | 20 | 6 | 150 | 20 | 6.5 | 6 | 50 | 30 | 6.5 |

| | Second step | | | | | Third step | | | |
|---|---|---|---|---|---|---|---|---|---|
| | | Non-crystalline resin particle dispersion | | | | | | | |
| | Difference in solid content concentration (second time − first time) (mass %) | Formula (1) −0.01 × A − 0.25 × B + 9.2 | Formula (1) −0.01 × A − 0.25 × B + 10.0 | Formula (2) Particle diameter of non-crystalline resin particle (mm) | Formula (3) Acid value of non-crystalline resin (mgKOH/g) | Presence or absence of opening of stirring tank | Air volume (L/(min · $m^3$)) | Color material addition method | Ratio (X/Y) |
| Example 1 | 15 | 4.3 | 5.1 | 180 | 12.4 | Present | 15 | Dispersion | 36 |
| Example 2 | 15 | 4.3 | 5.1 | 180 | 12.4 | Absent | 0 | Dispersion | 33 |
| Example 3 | 10 | 5.1 | 5.9 | 100 | 12.4 | Present | 15 | Dispersion | 28 |
| Example 4 | 10 | 5.2 | 6 | 90 | 12.4 | Present | 15 | Dispersion | 18 |
| Example 5 | 10 | 3.6 | 4.4 | 250 | 12.4 | Present | 15 | Dispersion | 24 |
| Example 6 | 10 | 3.5 | 4.3 | 260 | 12.4 | Present | 15 | Dispersion | 17 |
| Example 7 | 10 | 5.7 | 6.5 | 225 | 4.9 | Present | 15 | Dispersion | 16 |
| Example 8 | 10 | 5.7 | 6.5 | 226 | 5.1 | Present | 15 | Dispersion | 27 |
| Example 9 | 15 | 3.1 | 3.9 | 112 | 19.8 | Present | 15 | Dispersion | 28 |
| Example 10 | 15 | 3.0 | 3.8 | 112 | 20.4 | Present | 15 | Dispersion | 22 |
| Comparative Example 1 | 15 | 3.1 | 3.9 | 113 | 19.8 | Present | 15 | Dispersion | 8 |
| Example 11 | 15 | 3.1 | 3.9 | 113 | 19.8 | Present | 15 | Dispersion | 30 |
| Example 12 | 10 | 5.7 | 6.5 | 226 | 5.1 | Present | 15 | Dispersion | 29 |

TABLE 1-2

| | First step | | | Second step — Number of times of addition of non-crystalline resin particle dispersion — First time | | | | Second time | | | |
|---|---|---|---|---|---|---|---|---|---|---|---|
| | Number-average diameter of first aggregated particle (μm) | pH of first aggregated particle dispersion | Dispersion stirring time (min) | Type of non-crystalline resin particle dispersion | Addition amount of non-crystalline resin particle dispersion (part) | Solid content concentration of non-crystalline resin particle dispersion (mass %) | pH of non-crystalline resin particle dispersion | Type of non-crystalline resin particle dispersion | Addition amount of non-crystalline resin particle dispersion (part) | Solid content concentration of non-crystalline resin particle dispersion (mass %) | pH of non-crystalline resin particle dispersion |
| Comparative Example 2 | 4.4 | 4.2 | 20 | 6 | 150 | 20 | 6.6 | 6 | 50 | 30 | 6.6 |
| Example 13 | 4.6 | 3.5 | 0 | 1 | 100 | 15 | 4.6 | 1 | 100 | 30 | 4.8 |
| Example 14 | 4.6 | 3.5 | 5 | 1 | 150 | 50 | 4.6 | — | 0 | — | — |
| Example 15 | 4.4 | 4.2 | 20 | 1 | 200 | 10 | 4.6 | 1 | 120 | 20 | 4.8 |
| Example 16 | 4.6 | 3.5 | 5 | 1 | 100 | 10 | 4.6 | 1 | 110 | 31 | 4.8 |
| Example 17 | 4.6 | 3.5 | 5 | 1 | 100 | 10 | 4.6 | 1 | 110 | 30 | 4.8 |
| Example 18 | 4.6 | 3.5 | 5 | 1 | 80 | 23 | 4.6 | 1 | 100 | 25 | 4.8 |
| Example 19 | 4.6 | 3.5 | 5 | 1 | 80 | 24 | 4.6 | 1 | 100 | 25 | 4.8 |
| Example 20 | 4.8 | 6.0 | 10 | 4 | 100 | 20 | 3.7 | 4 | 80 | 30 | 4 |
| Example 21 | 4.6 | 3.5 | 5 | 1 | 100 | 15 | 4.6 | 1 | 100 | 30 | 4.8 |
| Example 22 | 4.6 | 3.5 | 5 | 1 | 100 | 15 | 4.6 | 1 | 100 | 30 | 4.8 |
| Example 23 | 4.6 | 3.5 | 5 | 1 | 100 | 15 | 4.6 | 1 | 100 | 30 | 4.8 |
| Example 24 | 4.6 | 3.5 | 5 | 1 | 100 | 15 | 4.6 | 1 | 100 | 30 | 4.8 |
| Example 25 | 4.6 | 3.5 | 5 | 1 | 100 | 15 | 4.6 | 1 | 100 | 30 | 4.8 |

| | Second step | Second step — Non-crystalline resin particle dispersion — Formula (1) | | Formula (2) | Formula (3) | Third step | | | |
|---|---|---|---|---|---|---|---|---|---|
| | Difference in solid content concentration (second time − first time) (mass %) | −0.01 × A − 0.25 × B + 9.2 | −0.01 × A − 0.25 × B + 10.0 | Particle diameter of non-crystalline resin particle (mm) | Acid value of non-crystalline resin (mgKOH/g) | Presence or absence of opening of stirring tank | Air volume (L/(min · m³)) | Color material addition method | Ratio (X/Y) |
| Comparative Example 2 | 10 | 5.7 | 6.5 | 226 | 5.1 | Present | 15 | Dispersion | 9 |
| Example 13 | 15 | 4.3 | 5.1 | 180 | 12.4 | Present | 15 | Dispersion | 21 |
| Example 14 | — | 4.3 | 5.1 | 180 | 12.4 | Present | 15 | Dispersion | 19 |
| Example 15 | 10 | 4.3 | 5.1 | 180 | 12.4 | Present | 15 | Dispersion | 20 |
| Example 16 | 21 | 4.3 | 5.1 | 180 | 12.4 | Present | 15 | Dispersion | 18 |
| Example 17 | 20 | 4.3 | 5.1 | 180 | 12.4 | Present | 15 | Dispersion | 25 |
| Example 18 | 2 | 4.3 | 5.1 | 180 | 12.4 | Present | 15 | Dispersion | 24 |
| Example 19 | 1 | 4.3 | 5.1 | 180 | 12.4 | Present | 15 | Dispersion | 17 |
| Example 20 | 10 | 3.6 | 4.4 | 230 | 12.4 | Present | 15 | Dispersion | 18 |
| Example 21 | 15 | 4.3 | 5.1 | 180 | 12.4 | Present | 4 | Dispersion | 23 |
| Example 22 | 15 | 4.3 | 5.1 | 180 | 12.4 | Present | 5 | Dispersion | 31 |
| Example 23 | 15 | 4.3 | 5.1 | 180 | 12.4 | Present | 152 | Dispersion | 33 |
| Example 24 | 15 | 4.3 | 5.1 | 180 | 12.4 | Present | 150 | Dispersion | 24 |
| Example 25 | 15 | 4.3 | 5.1 | 180 | 12.4 | Present | 15 | Pigment | 34 |

In Table 1, "Difference in solid content concentration (second time−first time) (mass %)" represents a value of (solid content concentration of non-crystalline resin particle dispersion added for the second time)−(solid content concentration of non-crystalline resin particle dispersion added for the first time).

The description of "Presence or absence of opening of stirring tank" in Table 1 means whether or not the stirring tank used in the third step has an opening. The case where the stirring tank has an opening is described as "Present", and the case where the stirring tank does not have an opening is described as "Absent".

In Table 1, "Air volume (L/(min·m$^3$))" represents the air volume of the gas blown per unit amount of the second aggregated particle dispersion in the stirring tank.

In Table 1, "Color material addition method" indicates whether the flat color material was added as a color material particle dispersion or the aluminum pigment was added as it was in the charged material in the first step. In the examples described as "Dispersion", the charge material of the first step includes a color material particle dispersion. In the examples described as "Pigment", the charged material of the first step includes no color material particle dispersion, and the aluminum pigment was added as it is.

From the above results, it is seen that the method for producing a toner according to Examples can obtain a toner that reduces occurrence of gloss unevenness when an image having a high image density is formed after images were continuously formed under a high-temperature and high-humidity environment and then the image forming apparatus is stopped for a certain period of time.

What is claimed is:

1. A method for producing an electrostatic charge image development toner, the method comprising:

a first step of aggregating polyester resin particles and a flat color material to produce a first aggregated particle dispersion in which first aggregated particles having a number-average particle diameter of 1 μm or more are dispersed;

a second step of adding a non-crystalline resin particle dispersion in which non-crystalline resin particles are dispersed with the first aggregated particle dispersion to cause the non-crystalline resin particles to be attached to the first aggregated particles and obtain second aggregated particles, wherein the second step includes adding the non-crystalline resin particle dispersion to the first aggregated particle dispersion two or more times, a solid content concentration of the non-crystalline resin particle dispersion satisfies Formula (4), solid content concentration of the non-crystalline resin particle dispersion added for ($n$)th time<solid content concentration of the non-crystalline resin particle dispersion added for ($n$+1)th time, Formula (4):

wherein n is an integer of 1 or more; and a third step of heating a second aggregated particle dispersion in which the second aggregated particles are dispersed to cause the second aggregated particles to coalesce, wherein the non-crystalline resin particle dispersion satisfies Formulae (1) to (3), $$-0.01\times A-0.25\times B+9.2\leq \mathrm{pH}\leq -0.01\times A-0.25\times B+10.0 \quad \text{Formula (1):}$$

$$100\ \mathrm{nm}\leq A\leq 250\ \mathrm{nm} \quad \text{Formula (2):}$$

$$5\ \mathrm{mgKOH/g}\leq B\leq 20\ \mathrm{mgKOH/g}, \quad \text{Formula (3):}$$

wherein A is a particle diameter of the non-crystalline resin particles, B is an acid value of the non-crystalline resin, and pH is a pH of the non-crystalline resin particle dispersion.

2. A method for producing an electrostatic charge image development toner, the method comprising:

a first step of aggregating polyester resin particles and a flat color material to prepare a first aggregated particle dispersion in which first aggregated particles having a number-average particle diameter of 1 μm or more are dispersed;

a second step of adding a non-crystalline resin particle dispersion in which non-crystalline resin particles are dispersed with the first aggregated particle dispersion to cause the non-crystalline resin particles to be attached to the first aggregated particles and obtain second aggregated particles, wherein the second step includes adding the non-crystalline resin particle dispersion to the first aggregated particle dispersion two or more times, a solid content concentration of the non-crystalline resin particle dispersion satisfies Formula (4), solid content concentration of the non-crystalline resin particle dispersion added for ($n$)th time<solid content concentration of the non-crystalline resin particle dispersion added for ($n$+1)th time, Formula (4):

wherein n is an integer of 1 or more; and a third step of heating a second aggregated particle dispersion in which the second aggregated particles are dispersed to cause the second aggregated particles to coalesce, wherein a pH of the non-crystalline resin particle dispersion is 3.0 or more and 6.5 or less.

3. The method for producing an electrostatic charge image development toner according to claim 1, wherein the first step includes stirring a dispersion in which the polyester resin particles and the flat color material are dispersed with a stirring blade before aggregating the polyester resin particles and the flat color material.

4. The method for producing an electrostatic charge image development toner according to claim 1, wherein the solid content concentration of the non-crystalline resin particle dispersion satisfies Formula (5), 2 mass %≤(solid content concentration of the non-crystalline resin particle dispersion added for ($n$+1)th time)−(solid content concentration of the non-crystalline resin particle dispersion added for ($n$)th time)≤20 mass %, Formula (5):

wherein n is an integer of 1 or more.

5. The method for producing an electrostatic charge image development toner according to claim 1, wherein a pH of the first aggregated particle dispersion is lower than the pH of the non-crystalline resin particle dispersion.

6. The method for producing an electrostatic charge image development toner according to claim 1, wherein the third step is performed in a stirring tank with an opening, the stirring tank containing the second aggregated particles dispersion, in which coalescence of the second aggregated particles is performed in a state where a gas having an air volume of 5 L/(min·$m^3$) or more is blown per unit amount of the second aggregated particle dispersion in the stirring tank.

7. The method for producing an electrostatic charge image development toner according to claim 6, wherein the air volume is 5 L/(min·$m^3$) or more and 150 L/(min·$m^3$) or less per unit amount of the second aggregated particle dispersion in the stirring tank.

8. The method for producing an electrostatic charge image development toner according to claim 1, the method further comprising, prior to the first step, a step of stirring the flat color material, a surfactant, and a dispersion medium to obtain a color material dispersion.

* * * * *